United States Patent
Oh et al.

(10) Patent No.: US 9,042,473 B2
(45) Date of Patent: May 26, 2015

(54) APPARATUS AND METHOD FOR RECEIVING DATA IN COMMUNICATION SYSTEM

(75) Inventors: Jong-Ee Oh, Daejeon (KR); Hee-Jung Yu, Daejeon (KR); Yu-Ro Lee, Daejeon (KR); In-Kyeong Choi, Daejeon (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 136 days.

(21) Appl. No.: 13/371,299

(22) Filed: Feb. 10, 2012

(65) Prior Publication Data

US 2012/0207236 A1    Aug. 16, 2012

(30) Foreign Application Priority Data

Feb. 11, 2011  (KR) ......................... 10-2011-0012394
Feb. 9, 2012   (KR) ......................... 10-2012-0013417

(51) Int. Cl.
*H04B 7/08*  (2006.01)
*H04B 7/04*  (2006.01)
*H04B 7/06*  (2006.01)

(52) U.S. Cl.
CPC ............ *H04B 7/0854* (2013.01); *H04B 7/0663* (2013.01); *H04B 7/0417* (2013.01); *H04B 7/0452* (2013.01); *H04B 7/0626* (2013.01)

(58) Field of Classification Search
USPC ........................................................ 375/267
See application file for complete search history.

(56) References Cited

U.S. PATENT DOCUMENTS

| | | | | |
|---|---|---|---|---|
| 2007/0258538 A1* | 11/2007 | Wight | ........................... | 375/267 |
| 2008/0130765 A1* | 6/2008 | Wight | ........................... | 375/260 |
| 2008/0317141 A1* | 12/2008 | Burg et al. | ..................... | 375/260 |
| 2009/0154587 A1* | 6/2009 | Cheong et al. | ................. | 375/267 |
| 2009/0175375 A1* | 7/2009 | Zhang | ............................ | 375/267 |
| 2010/0208839 A1* | 8/2010 | Walton et al. | .................. | 375/267 |
| 2011/0176627 A1* | 7/2011 | Wu et al. | ........................ | 375/260 |
| 2011/0205118 A1* | 8/2011 | Ojard et al. | ................... | 342/373 |

FOREIGN PATENT DOCUMENTS

| | | |
|---|---|---|
| JP | 2009-253975 A | 10/2009 |
| KR | 1020100057177 A | 5/2010 |

OTHER PUBLICATIONS

Joonsuk Kim et al., "11ac Explicit Feedback Format", IEEE 802.11-10/1227r0, Nov. 11, 2010.
Sameer Vermani et al., "Dimension Reducation for MU-MIMO", IEEE 802.11-11/0053r1, Jan. 17, 2011.

* cited by examiner

Primary Examiner — Santiago Garcia

(57) ABSTRACT

Disclosed is an apparatus for receiving data in a communication system, including: a receiving unit configured to receive data transmitted from an access point (AP) by a multi-input multi-output (MIMO) scheme; a detecting unit configured to detect a data stream of the received data using an LQ decomposition scheme; a generating unit configured to generate channel information regarding the data stream; and a transmitting unit configured to feedback the channel information to the AP.

14 Claims, 13 Drawing Sheets

APPARATUS AND METHOD FOR RECEIVING DATA IN COMMUNICATION SYSTEM

CROSS-REFERENCES TO RELATED APPLICATIONS

The present application claims priority of Korean Patent Application Nos. 10-2011-0012394 and 10-2012-0013417, filed on Feb. 11, 2011, and Feb. 9, 2012, respectively, which are incorporated herein by reference in their entirety.

BACKGROUND OF THE INVENTION

1. Field of the Invention

Exemplary embodiments of the present invention relate to a communication system, and more particularly, to an apparatus and a method for receiving data feedbacking channel information using an LQ decomposition scheme in a communication system that provides services using a multi-input multi-output (hereinafter, referred to as 'MIMO') scheme.

2. Description of Related Art

In a current communication system, research for providing services having various quality of services (hereinafter, referred to as 'QoS') to users at a high transmission rate has been actively conducted. As an example of the communication system, in a wireless local area network (hereinafter, referred to as 'WLAN') system, research into methods for stably transmitting large-capacity data at high rate using limited resources has been actively conducted. In particular, in a communication system, research into data transmission through a wireless channel has been conducted. Recently, methods for allowing the WLAN system to normally transmit and receive large-capacity data by effectively using a limited wireless channel have been proposed.

Meanwhile, in a recent communication system, there has been proposed a method for transmitting and receiving large-capacity data to and from, a plurality of terminals, for example, STAs through a plurality of base stations, for example, an access point (hereinafter, referred to as 'AP') by the MIMO scheme. Herein, the STAs can access all the APs and thus, the STAs selects any one of the APs and wirelessly accesses the selected AP to transmit and receives large-capacity data to and from a single AP through the wireless channel by the MIMO scheme.

However, the current communication system, in order for any AP to transmit the large-capacity data to the STAs by the MIMO scheme, there is a need to feedback the channel information regarding a data stream between the APs and the STAs at the time of transmitting data by the MIMO scheme; however, a detailed method for feedbacking the channel information has not yet been proposed. In other words, as described above, in order to transmit and receive the large-capacity data between the APs and the STAs by the MIMO scheme, for example, a single user-MIMO scheme and a multi user-MIMO scheme, a receiver, for example, the STAs need to feedback the channel information regarding the data stream between the APs and the STAs to a transmitter, for example, the AP. However, in the current communication system, in order for the receiver to normally receive the large-capacity data by the user-MIMO scheme and the multi-user MIMO scheme, a detailed method for feedbacking the channel information to the transmitter has not yet been proposed. Therefore, there is a limitation in normally transmitting and receiving the large-capacity data by the single user-MIMO scheme and the multi user-MIMO scheme.

Therefore, in order to transmit and receive the large-capacity data to the plurality of STAs through the plurality of APs by the single user-MIMO scheme and the multi user-MIMO using limited resources in the communication system, for example, the WLAN system, a need exists for a method for receiving data enabling the receiver to normally feedback the channel information regarding the data stream.

SUMMARY OF THE INVENTION

An embodiment of the present invention is directed to an apparatus and a method for receiving data in a communication system.

Another embodiment of the present invention is directed to an apparatus and a method for receiving data normally feedbacking channel information regarding a data stream so as to transmit and receive large-capacity data by a single user-MIMO scheme and a multi user-MIMO using limited resources in the communication system.

In accordance with an embodiment of the present invention, an apparatus for receiving data in a communication system, includes: a receiving unit configured to receive data transmitted from an access point (AP) by a multi-input multi-output (MIMO) scheme; a detecting unit configured to detect a data stream of the received data using an LQ decomposition scheme; a generating unit configured to generate channel information regarding the data stream; and a transmitting unit configured to feedback the channel information to the AP.

In accordance with another embodiment of the present invention, a method for receiving data, includes: receiving data transmitted from an access point (AP) by a multi-input multi-output (MIMO) scheme; detecting a data stream of the received data using an LQ decomposition scheme; generating channel information regarding the data stream; and feedbacking the channel information to the AP.

DESCRIPTION OF SPECIFIC EMBODIMENTS

Figure 1:
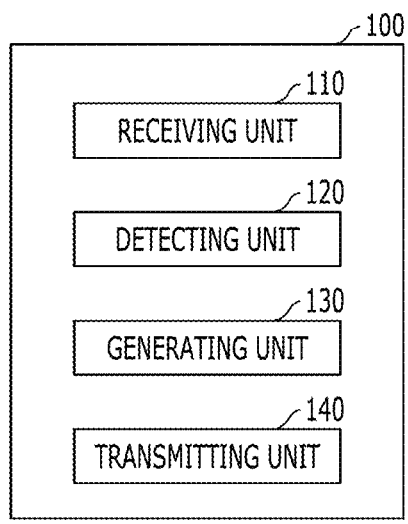
FIG. 1 is a diagram schematically illustrating an apparatus for receiving data in a communication system in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An embodiment of the present invention proposes an apparatus and a method for receiving data in a communication system, for example, a wireless local area network (hereinafter, referred to as 'WLAN') system. Herein, even though the embodiment of the present invention describes an example of the WLAN system, a method for receiving data proposed in the embodiment of the present invention may be applied to other communication systems.

In addition, the embodiment of the present invention proposes an apparatus and a method for receiving data that provides services to multi users by the MIMO scheme using limited resources, for example, wireless channels in a communication system. In accordance with the embodiment of the present invention, in order for a transmitter, for example, an access point (hereinafter, referred to as 'AP') in the communication system to transmit and receive large-capacity data to a receiver, for example, a terminal, that is, a station (hereinafter, referred to as 'STA') by a MIMO scheme, for example, a single user-MIMO scheme and a multi user-MIMO scheme, the receiver normally feedbacks channel information regarding a data stream of large-capacity data using an LQ decomposition scheme, thereby stably the large-capacity data at high rate by the single user-MIMO scheme and the multi user-MIMO scheme.

That is, in accordance with the embodiment of the present invention, when the large-capacity data are transmitted and received to and from the plurality of terminals, for example, the STAs through the plurality of base stations, for example, the APs by the MIMO scheme, in order for the STA to wirelessly access any one of the APs to receive the large-capacity data by the single user-MIMO scheme and the multi user-MIMO scheme, the channel information regarding the data stream between the AP and the STA is fedback by the LQ decomposition scheme. In other words, in accordance with the embodiment of the present invention, when receiving the large-capacity data from the transmitter, for example, the AP by the single user-MIMO scheme and the multi user-MIMO scheme, the receiver, for example, the STA feedbacks the channel information regarding the data stream of the received large-capacity data to the transmitter by the LQ decomposition scheme. Hereinafter, an apparatus for receiving data in a communication system in accordance with the embodiment of the present invention will be described in more detail with reference to FIG. 1.

FIG. 1 is a diagram schematically illustrating a structure of an apparatus for receiving data in a communication system in accordance with the embodiment of the present invention.

Referring to FIG. 1, an apparatus 100 for receiving data is configured to include: a receiving unit 110 that receives data from an apparatus for transmitting data through a wireless channel by a single user-MIMO scheme and a multi user-MIMO scheme; a detecting unit 120 that detects a data stream of the received data; a generating unit 130 that generates channel information regarding the detected data stream, for example, channel state information (hereinafter, referred to as 'CSI'); and a transmitting unit 140 that feedbacks channel information regarding the data stream to the apparatus for transmitting data, for example, the AP. Herein, the apparatus 100 for receiving data receives data transmitted by the single user-MIMO scheme and the multi user-MIMO scheme through the wireless channel by using a maximum-likelihood (hereinafter, referred to as 'ML') scheme or a zero-forcing (hereinafter, referred to as 'ZF') scheme.

As described above, the receiving unit 110 receives large-capacity data from the AP by the single user-MIMO scheme and the multi user-MIMO scheme. Here, the AP, that is, the apparatus for transmitting data receives the channel information regarding the data stream at the time of transmitting data by the single user-MIMO scheme and the multi user-MIMO scheme from the apparatus for receiving data and performs beamforming at the time of transmitting data to the terminal, that is, the apparatus 100 for receiving data based on the received channel information to transmit the large-capacity data to the apparatus 100 for receiving data by the single user-MIMO scheme and the multi user-MIMO scheme.

Further, the detecting unit 120 detects the data stream of the data received from the apparatus for transmitting data through the receiving unit 110. In this case, the detecting unit 120 detects the data stream of the received data by using the LQ decomposition scheme. Herein, the detecting unit 120 decomposes the received data into a unitary matrix form and a low-triangular matrix form by the LQ decomposition scheme, that is, decomposes a receive signal y of the received data into an L matrix of the low triangular matrix form and a Q matrix of the unitary matrix form. For example, the receive signal y may be represented as the L matrix, the Q matrix, an original signal s, and noise n by the LQ decomposition ($y=L \cdot Q \cdot s+n$).

As another embodiment of the present invention, the detecting unit 120 can detect the data stream of the received data by using a singular value decomposition (hereinafter, referred to as 'SVD') different from the LQ decomposition scheme. In this case, since the detecting unit 120 more improves the performance of the apparatus for receiving data when detecting the data stream of the received data using the LQ decomposition scheme as compared with the SVD scheme, it is more preferable to detect the data stream of the received data using the LQ decomposition scheme. Further, when the data stream of the received data is detected by the LQ decomposition scheme rather than the SVD scheme, the receive signal y may be represented as a U matrix, an S matrix, a V matrix, the original signal s, and the noise n by the SVD scheme ($y=U \cdot S \cdot VH \cdot s+n$). The LQ decomposition of the received data in the detecting unit 120 and the SVD will be described in more detail with reference to the following Equations.

In addition, the generating unit 120 generates the channel information regarding the data stream detected by the LQ decomposition scheme in the detecting unit 120. As described above, the generating unit 120 generates the Q matrix as the channel information regarding the data stream in the receive signal y represented as the L matrix, the Q matrix, the original signal s, and the noise y by the LQ decomposition scheme and the transmitting unit 140 feedbacks the Q matrix acquired by the LQ decomposition as the channel information regarding the data stream to the apparatus for transmitting data. Here, the transmitting unit 140 feedbacks the V matrix acquired by the SVD as the channel information regarding the data stream to the apparatus for transmitting data when the detecting unit 120 detects the data stream by the SVD scheme rather than the LQ decomposition scheme. Here, an operation for receiving data in a communication system in accordance with the embodiment of the present invention will be described in more detail with reference to FIG. 2.

Figure 2:
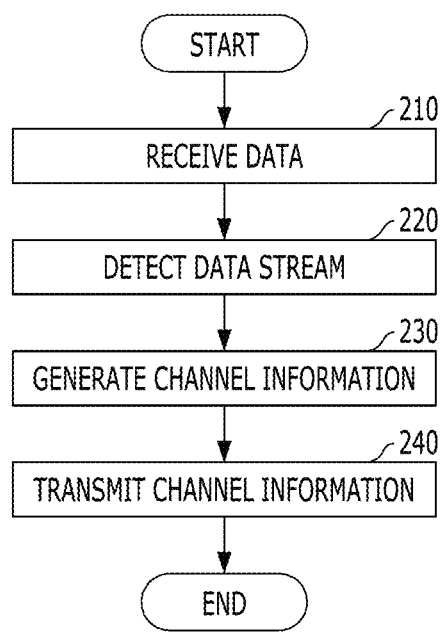
FIG. 2 is a diagram schematically illustrating an operational process of an apparatus for receiving data in the communication system in accordance with the exemplary embodiment of the present invention.

FIG. 2 is a diagram schematically illustrating an operational process of an apparatus for receiving data in the communication system in accordance with the embodiment of the present invention.

Referring to FIG. 2, at S210, the apparatus for receiving data receives the large-capacity data transmitted by the single user-MIMO scheme and the multi user-MIMO scheme from the apparatus for transmitting data.

Next, at S220, the apparatus for receiving data detects the data stream of the received data by using the LQ decomposition scheme. Here, the apparatus for receiving data may detect the data stream of the received data by the SVD scheme different from the LQ decomposition scheme. When the data stream is detected using the LQ decomposition scheme, the performance of the LQ decomposition scheme is more improved and therefore, it is more preferable to detect the data stream of the received data using the LQ decomposition scheme. The detection of the data stream of the received data using the LQ decomposition scheme and the SVD scheme will be described in more detail with reference to the following Equations.

At S230, the apparatus for receiving data generates the channel information regarding the data stream detected by the LQ decomposition scheme and then, at S240, the channel information is fedback to the apparatus for transmitting data, that is, the channel information is transmitted to the apparatus for transmitting data. Here, the Q matrix in the data stream detected by the LQ decomposition scheme is fedback to the apparatus for transmitting data as the channel information regarding the data stream. As described above, when the data stream is detected by the SVD scheme, the V matrix in the data stream detected by the SVD scheme is fedback to the apparatus for transmitting data as the channel information regarding the data stream. Hereinafter, the data stream detected by the LQ decomposition scheme and the SVD scheme will be described in more detail.

First, when the apparatus for transmitting data, that is, the AP transmits the data to the apparatuses for receiving data, that is, the terminals through the wireless channel by the single user-MIMO scheme, the data received in the terminals, that is, the receive signal y may be represented by the following Equations 1 to 4. Here, Equation 1 represents the receive signal y when the single AP transmits data through four transmit antennas by the single user-MIMO scheme, the single terminal, that is, the single STA receives data through two receive antennas, and the data stream detected by the SVD scheme is two. In addition, as described above, the apparatus for receiving data, that is, the STA feedbacks the V matrix as the channel information regarding the data stream detected by the SVD scheme to the apparatus for transmitting data, that is, the AP. In this case, the AP performs the beamforming based on the V matrix fedback to the channel information to transmit data to the STA by the single user-MIMO scheme, wherein an effective channel for transmitting data according to the beamforming becomes a matrix in a unitary matrix×diagonal matrix form.

$$\begin{bmatrix} y_1 \\ y_2 \end{bmatrix} = \begin{bmatrix} h_{11} & h_{12} & h_{13} & h_{14} \\ h_{21} & h_{22} & h_{23} & h_{24} \end{bmatrix} \begin{bmatrix} p_{11} & p_{12} \\ p_{21} & p_{22} \\ p_{31} & p_{32} \\ p_{41} & p_{42} \end{bmatrix} \begin{bmatrix} s_1 \\ s_2 \end{bmatrix} + \begin{bmatrix} n_1 \\ n_2 \end{bmatrix} \quad \text{[Equation 1]}$$

$$= \begin{bmatrix} u_{11} & u_{12} \\ u_{21} & u_{22} \end{bmatrix} \begin{bmatrix} d_1 & 0 & 0 & 0 \\ 0 & d_2 & 0 & 0 \end{bmatrix} \begin{bmatrix} v_{11} & v_{12} & v_{13} & v_{14} \\ v_{21} & v_{22} & v_{23} & v_{24} \\ v_{31} & v_{32} & v_{33} & v_{34} \\ v_{41} & v_{42} & v_{43} & v_{44} \end{bmatrix}$$

$$\begin{bmatrix} v_{11}^* & v_{21}^* \\ v_{12}^* & v_{22}^* \\ v_{13}^* & v_{23}^* \\ v_{14}^* & v_{24}^* \end{bmatrix} \begin{bmatrix} s_1 \\ s_2 \end{bmatrix} + \begin{bmatrix} n_1 \\ n_2 \end{bmatrix}$$

$$\begin{bmatrix} y_1 \\ y_2 \end{bmatrix} = \begin{bmatrix} u_{11} & u_{12} \\ u_{21} & u_{22} \end{bmatrix} \begin{bmatrix} d_1 & 0 & 0 & 0 \\ 0 & d_2 & 0 & 0 \end{bmatrix} \begin{bmatrix} 1 & 0 \\ 0 & 1 \\ 0 & 0 \\ 0 & 0 \end{bmatrix} \begin{bmatrix} s_1 \\ s_2 \end{bmatrix} + \begin{bmatrix} n_1 \\ n_2 \end{bmatrix}$$

$$= \begin{bmatrix} u_{11} & u_{12} \\ u_{21} & u_{22} \end{bmatrix} \begin{bmatrix} d_1 & 0 \\ 0 & d_2 \end{bmatrix} \begin{bmatrix} s_1 \\ s_2 \end{bmatrix} + \begin{bmatrix} n_1 \\ n_2 \end{bmatrix}$$

$$y = U \cdot S \cdot V^H \cdot P \cdot s + n = U \cdot S \cdot \begin{bmatrix} v_1 \\ v_2 \\ v_3 \\ v_4 \end{bmatrix} \cdot [v_1^H \, v_2^H] \cdot s + n$$

Further, Equation 2 represents the receive signal y when the single AP transmits data through four transmit antennas by the single user-MIMO scheme, the single terminal, that is, the single STA receives data through two receive antennas, and the data stream detected by the SVD scheme is one. In addition, as described above, the apparatus for receiving data, that is, the STA feedbacks the V matrix as the channel information regarding the data stream detected by the SVD scheme to the apparatus for transmitting data, that is, the AP. In this case, the AP performs the beamforming based on the V matrix fedback to the channel information to transmit data to the STA by the single user-MIMO scheme, wherein the effective channel for transmitting data according to the beamforming becomes a matrix in a unitary matrix×diagonal matrix form.

$$\begin{bmatrix} y_1 \\ y_2 \end{bmatrix} = \begin{bmatrix} h_{11} & h_{12} & h_{13} & h_{14} \\ h_{21} & h_{22} & h_{23} & h_{24} \end{bmatrix} \begin{bmatrix} p_{11} \\ p_{21} \\ p_{31} \\ p_{41} \end{bmatrix} [s_1] + \begin{bmatrix} n_1 \\ n_2 \end{bmatrix} \quad \text{[Equation 2]}$$

$$= \begin{bmatrix} u_{11} & u_{12} \\ u_{21} & u_{22} \end{bmatrix} \begin{bmatrix} d_1 & 0 & 0 & 0 \\ 0 & d_2 & 0 & 0 \end{bmatrix} \begin{bmatrix} v_{11} & v_{12} & v_{13} & v_{14} \\ v_{21} & v_{22} & v_{23} & v_{24} \\ v_{31} & v_{32} & v_{33} & v_{34} \\ v_{41} & v_{42} & v_{43} & v_{44} \end{bmatrix}$$

$$\begin{bmatrix} v_{11}^* \\ v_{12}^* \\ v_{13}^* \\ v_{14}^* \end{bmatrix} [s_1] + \begin{bmatrix} n_1 \\ n_2 \end{bmatrix}$$

$$\begin{bmatrix} y_1 \\ y_2 \end{bmatrix} = \begin{bmatrix} u_{11} & u_{12} \\ u_{21} & u_{22} \end{bmatrix} \begin{bmatrix} d_1 & 0 & 0 & 0 \\ 0 & d_2 & 0 & 0 \end{bmatrix} \begin{bmatrix} 1 \\ 0 \\ 0 \\ 0 \end{bmatrix} [s_1] + \begin{bmatrix} n_1 \\ n_2 \end{bmatrix}$$

$$= \begin{bmatrix} u_{11} & u_{12} \\ u_{21} & u_{22} \end{bmatrix} \begin{bmatrix} d_1 \\ 0 \end{bmatrix} [s_1] + \begin{bmatrix} n_1 \\ n_2 \end{bmatrix}$$

$$y = U \cdot S \cdot V^H \cdot P \cdot s_1 + n = U \cdot S \cdot \begin{bmatrix} v_1 \\ v_2 \\ v_3 \\ v_4 \end{bmatrix} \cdot [v_1^H] \cdot s_1 + n$$

Further, Equation 3 represents the receive signal y when the single AP transmits data through four transmit antennas by the single user-MIMO scheme, the single terminal, that is, the single STA receives data through two receive antennas, and the data stream detected by the LQ decomposition scheme is two. In addition, as described above, the apparatus for receiving data, that is, the STA feedbacks the Q matrix as the channel information regarding the data stream detected by the LQ decomposition scheme to the apparatus for transmitting data, that is, the AP. In this case, the AP performs the beamforming based on the Q matrix fedback to the channel information to transmit data to the STA by the single user-MIMO scheme, wherein the effective channel for transmitting data according to the beamforming becomes a matrix in a unitary matrix×low triangular matrix form. As described above, according to effective channel having the unitary matrix×low triangular matrix form, the data receiving performance of the apparatus for receiving data is more improved in the case in which the data stream is detected by the LQ decomposition scheme than the case in which the data stream is detected by the SVD scheme.

$$\begin{bmatrix} y_1 \\ y_2 \end{bmatrix} = \begin{bmatrix} h_{11} & h_{12} & h_{13} & h_{14} \\ h_{21} & h_{22} & h_{23} & h_{24} \end{bmatrix} \begin{bmatrix} p_{11} & p_{12} \\ p_{21} & p_{22} \\ p_{31} & p_{32} \\ p_{41} & p_{42} \end{bmatrix} \begin{bmatrix} s_1 \\ s_2 \end{bmatrix} + \begin{bmatrix} n_1 \\ n_2 \end{bmatrix} \quad \text{[Equation 3]}$$

$$= \begin{bmatrix} l_{11} & 0 & 0 & 0 \\ l_{21} & l_{22} & 0 & 0 \end{bmatrix} \begin{bmatrix} q_{11} & q_{12} & q_{13} & q_{14} \\ q_{21} & q_{22} & q_{23} & q_{24} \\ q_{31} & q_{32} & q_{33} & q_{34} \\ q_{41} & q_{42} & q_{43} & q_{44} \end{bmatrix} \begin{bmatrix} q_{11}^* & q_{21}^* \\ q_{12}^* & q_{22}^* \\ q_{13}^* & q_{23}^* \\ q_{14}^* & q_{24}^* \end{bmatrix} \begin{bmatrix} s_1 \\ s_2 \end{bmatrix} + \begin{bmatrix} n_1 \\ n_2 \end{bmatrix}$$

$$\begin{bmatrix} y_1 \\ y_2 \end{bmatrix} = \begin{bmatrix} l_{11} & 0 & 0 & 0 \\ l_{21} & l_{22} & 0 & 0 \end{bmatrix} \begin{bmatrix} 1 & 0 \\ 0 & 1 \\ 0 & 0 \\ 0 & 0 \end{bmatrix} \begin{bmatrix} s_1 \\ s_2 \end{bmatrix} + \begin{bmatrix} n_1 \\ n_2 \end{bmatrix}$$

$$= \begin{bmatrix} l_{11} & 0 \\ l_{21} & l_{22} \end{bmatrix} \begin{bmatrix} s_1 \\ s_2 \end{bmatrix} + \begin{bmatrix} n_1 \\ n_2 \end{bmatrix}$$

$$y = L \cdot Q \cdot P \cdot s + n = L \cdot \begin{bmatrix} q_1 \\ q_2 \\ q_3 \\ q_4 \end{bmatrix} \cdot [q_1^H \, q_2^H] \cdot s + n$$

Further, Equation 4 represents the receive signal y when the single AP transmits data through four transmit antennas by the single user-MIMO scheme, the single terminal, that is, the single STA receives data through two receive antennas, and the data stream detected by the LQ decomposition scheme is one. In addition, as described above, the apparatus for receiving data, that is, the STA feedbacks the Q matrix as the channel information regarding the data stream detected by the LQ decomposition scheme to the apparatus for transmitting data, that is, the AP. In this case, the AP performs the beamforming based on the Q matrix fedback to the channel information to transmit data to the STA by the single user-MIMO scheme, wherein the effective channel for transmitting data according to the beamforming becomes a matrix in a unitary matrix×low triangular matrix form. As described above, according to effective channel having the unitary matrix×low triangular matrix form, the data receiving performance of the apparatus for receiving data is more improved in the case in which the data stream is detected by the LQ decomposition scheme than the case in which the data stream is detected by the SVD scheme.

$$\begin{bmatrix} y_1 \\ y_2 \end{bmatrix} = \begin{bmatrix} h_{11} & h_{12} & h_{13} & h_{14} \\ h_{21} & h_{22} & h_{23} & h_{24} \end{bmatrix} \begin{bmatrix} p_{11} \\ p_{21} \\ p_{31} \\ p_{41} \end{bmatrix} [s_1] + \begin{bmatrix} n_1 \\ n_2 \end{bmatrix} \quad \text{[Equation 4]}$$

$$= \begin{bmatrix} l_{11} & 0 & 0 & 0 \\ l_{21} & l_{22} & 0 & 0 \end{bmatrix} \begin{bmatrix} q_{11} & q_{12} & q_{13} & q_{14} \\ q_{21} & q_{22} & q_{23} & q_{24} \\ q_{31} & q_{32} & q_{33} & q_{34} \\ q_{41} & q_{42} & q_{43} & q_{44} \end{bmatrix} \begin{bmatrix} q_{11}^* \\ q_{12}^* \\ q_{13}^* \\ q_{14}^* \end{bmatrix}$$

$$[s_1] + \begin{bmatrix} n_1 \\ n_2 \end{bmatrix}$$

$$\begin{bmatrix} y_1 \\ y_2 \end{bmatrix} = \begin{bmatrix} l_{11} & 0 & 0 & 0 \\ l_{21} & l_{22} & 0 & 0 \end{bmatrix} \begin{bmatrix} 1 \\ 0 \\ 0 \\ 0 \end{bmatrix} [s_1] + \begin{bmatrix} n_1 \\ n_2 \end{bmatrix}$$

$$= \begin{bmatrix} l_{11} \\ l_{21} \end{bmatrix} [s_1] + \begin{bmatrix} n_1 \\ n_2 \end{bmatrix}$$

$$y = L \cdot Q \cdot P \cdot s_1 + n = L \cdot \begin{bmatrix} q_1 \\ q_2 \\ q_3 \\ q_4 \end{bmatrix} \cdot [q_1^H] \cdot s_1 + n$$

Further, Equation 5 represents the receive signal y when the single AP transmits data through four transmit antennas by the multi user-MIMO scheme, two terminals, that is, two STAs receive data through two receive antennas, and the data stream detected by the SVD scheme is two. In addition, as described above, the apparatus for receiving data, that is, the STAs feedbacks the V matrix as the channel information regarding the data stream detected by the SVD scheme to the apparatus for transmitting data, that is, the AP. In this case, the AP performs the beamforming based on the V matrix fedback to the channel information to transmit data to the STAs by the multi user-MIMO scheme, wherein the effective channel for transmitting data according to the beamforming becomes a matrix in a diagonal matrix form.

$$\begin{bmatrix} y_1^1 \\ y_2^1 \\ y_1^2 \\ y_2^2 \end{bmatrix} = \begin{bmatrix} h_{11}^1 & h_{12}^1 & h_{13}^1 & h_{14}^1 \\ h_{21}^1 & h_{22}^1 & h_{23}^1 & h_{24}^1 \\ h_{11}^2 & h_{12}^2 & h_{13}^2 & h_{14}^2 \\ h_{21}^2 & h_{22}^2 & h_{23}^2 & h_{24}^2 \end{bmatrix} \begin{bmatrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{bmatrix} \begin{bmatrix} s_1^1 \\ s_2^1 \\ s_1^2 \\ s_2^2 \end{bmatrix} + \begin{bmatrix} n_1^1 \\ n_2^1 \\ n_1^2 \\ n_2^2 \end{bmatrix} \quad \text{[Equation 5]}$$

$$= \begin{bmatrix} \begin{bmatrix} u^1_{11} & u^1_{12} \\ u^1_{21} & u^1_{22} \end{bmatrix} \begin{bmatrix} d^1_1 & 0 & 0 & 0 \\ 0 & d^1_2 & 0 & 0 \end{bmatrix} \begin{bmatrix} v^1_{11} & v^1_{12} & v^1_{13} & v^1_{14} \\ v^1_{21} & v^1_{22} & v^1_{23} & v^1_{24} \\ v^1_{31} & v^1_{32} & v^1_{33} & v^1_{34} \\ v^1_{41} & v^1_{42} & v^1_{43} & v^1_{44} \end{bmatrix} \\ \begin{bmatrix} u^2_{11} & u^2_{12} \\ u^2_{21} & u^2_{22} \end{bmatrix} \begin{bmatrix} d^2_1 & 0 & 0 & 0 \\ 0 & d^2_2 & 0 & 0 \end{bmatrix} \begin{bmatrix} v^2_{11} & v^2_{12} & v^2_{13} & v^2_{14} \\ v^2_{21} & v^2_{22} & v^2_{23} & v^2_{24} \\ v^2_{31} & v^2_{32} & v^2_{33} & v^2_{34} \\ v^2_{41} & v^2_{42} & v^2_{43} & v^2_{44} \end{bmatrix} \end{bmatrix} \begin{bmatrix} \begin{bmatrix} v^1_{11} & v^1_{12} & v^1_{13} & v^1_{14} \\ v^1_{21} & v^1_{22} & v^1_{23} & v^1_{24} \end{bmatrix} \\ \begin{bmatrix} v^2_{11} & v^2_{12} & v^2_{13} & v^2_{14} \\ v^2_{21} & v^2_{22} & v^2_{23} & v^2_{24} \end{bmatrix} \end{bmatrix}^{-1} \begin{bmatrix} s^1_1 \\ s^1_2 \\ s^2_1 \\ s^2_2 \end{bmatrix} + \begin{bmatrix} n^1_1 \\ n^1_2 \\ n^2_1 \\ n^2_2 \end{bmatrix}$$

$$\begin{bmatrix} y^1_1 \\ y^1_2 \\ y^2_1 \\ y^2_2 \end{bmatrix} = \begin{bmatrix} \begin{bmatrix} u^1_{11} & u^1_{12} \\ u^1_{21} & u^1_{22} \end{bmatrix} \begin{bmatrix} d^1_1 & 0 & 0 & 0 \\ 0 & d^1_2 & 0 & 0 \end{bmatrix} \begin{bmatrix} 1000 \\ 0100 \\   \\   \end{bmatrix} \\ \begin{bmatrix} u^2_{11} & u^2_{12} \\ u^2_{21} & u^2_{22} \end{bmatrix} \begin{bmatrix} d^2_1 & 0 & 0 & 0 \\ 0 & d^2_2 & 0 & 0 \end{bmatrix} \begin{bmatrix} 0010 \\ 0001 \\   \\   \end{bmatrix} \end{bmatrix} \begin{bmatrix} s^1_1 \\ s^1_2 \\ s^2_1 \\ s^2_2 \end{bmatrix} + \begin{bmatrix} n^1_1 \\ n^1_2 \\ n^2_1 \\ n^2_2 \end{bmatrix}$$

$$= \begin{bmatrix} \begin{bmatrix} u^1_{11} & u^1_{12} \\ u^1_{21} & u^1_{22} \end{bmatrix} \begin{bmatrix} d^1_1 & 0 & 0 & 0 \\ 0 & d^1_2 & 0 & 0 \end{bmatrix} \\ \begin{bmatrix} u^2_{11} & u^2_{12} \\ u^2_{21} & u^2_{22} \end{bmatrix} \begin{bmatrix} 0 & 0 & d^2_1 & 0 \\ 0 & 0 & 0 & d^2_2 \end{bmatrix} \end{bmatrix} \begin{bmatrix} s^1_1 \\ s^1_2 \\ s^2_1 \\ s^2_2 \end{bmatrix} + \begin{bmatrix} n^1_1 \\ n^1_2 \\ n^2_1 \\ n^2_2 \end{bmatrix}$$

Further, Equation 6 represents the receive signal y when the single AP transmits data through four transmit antennas by the multi user-MIMO scheme, two terminals, that is, two STAs receive data through two receive antennas, and the data stream detected by the SVD scheme is two. In addition, as described above, the apparatus for receiving data, that is, the STAs feedbacks the V matrix as the channel information regarding the data stream detected by the SVD scheme to the apparatus for transmitting data, that is, the AP. In this case, the AP performs the beamforming based on the V matrix fedback to the channel information to transmit data to the STAs by the multi user-MIMO scheme, wherein the effective channel for transmitting data according to the beamforming becomes a matrix in a diagonal matrix form. Here, the STAs, that is, the apparatus for receiving data uses an eigen-mode selection by previously storing the unitary matrix U and then, multiplying it by the receive signal.

[Equation 6]
$$\begin{bmatrix} y^1_1 \\ y^1_2 \\ y^1_3 \\ y^2_1 \\ y^2_2 \\ y^2_3 \end{bmatrix} = \begin{bmatrix} h^1_{11} & h^1_{12} & h^1_{13} & h^1_{14} \\ h^1_{21} & h^1_{22} & h^1_{23} & h^1_{24} \\ h^1_{31} & h^1_{32} & h^1_{33} & h^1_{34} \\ h^2_{11} & h^2_{12} & h^2_{13} & h^2_{14} \\ h^2_{21} & h^2_{22} & h^2_{23} & h^2_{24} \\ h^2_{31} & h^2_{32} & h^2_{33} & h^2_{34} \end{bmatrix} \begin{bmatrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{bmatrix} \begin{bmatrix} s^1_1 \\ s^1_2 \\ s^2_1 \\ s^2_2 \end{bmatrix} + \begin{bmatrix} n^1_1 \\ n^1_2 \\ n^2_1 \\ n^2_2 \end{bmatrix}$$

$$= \left| \begin{bmatrix} \begin{bmatrix} u^1_{11} & u^1_{12} & u^1_{13} \\ u^1_{21} & u^1_{22} & u^1_{23} \\ u^1_{31} & u^1_{32} & u^1_{33} \end{bmatrix} \begin{bmatrix} d^1_1 & 0 & 0 & 0 \\ 0 & d^1_2 & 0 & 0 \\ 0 & 0 & d^1_3 & 0 \end{bmatrix} \begin{bmatrix} v^1_{11} & v^1_{12} & v^1_{13} & v^1_{14} \\ v^1_{21} & v^1_{22} & v^1_{23} & v^1_{24} \\ v^1_{31} & v^1_{32} & v^1_{33} & v^1_{34} \\ v^1_{41} & v^1_{42} & v^1_{43} & v^1_{44} \end{bmatrix} \\ \begin{bmatrix} u^2_{11} & u^2_{12} & u^2_{13} \\ u^2_{21} & u^2_{22} & u^2_{23} \\ u^2_{31} & u^2_{32} & u^2_{33} \end{bmatrix} \begin{bmatrix} d^2_1 & 0 & 0 & 0 \\ 0 & d^2_2 & 0 & 0 \\ 0 & 0 & d^2_3 & 0 \end{bmatrix} \begin{bmatrix} v^2_{11} & v^2_{12} & v^2_{13} & v^2_{14} \\ v^2_{21} & v^2_{22} & v^2_{23} & v^2_{24} \\ v^2_{31} & v^2_{32} & v^2_{33} & v^2_{34} \\ v^2_{41} & v^2_{42} & v^2_{43} & v^2_{44} \end{bmatrix} \end{bmatrix} \right|$$

$$\begin{bmatrix} v^1_{11} & v^1_{12} & v^1_{13} & v^1_{14} \\ v^1_{21} & v^1_{22} & v^1_{23} & v^1_{24} \\ v^2_{11} & v^2_{12} & v^2_{13} & v^2_{14} \\ v^2_{21} & v^2_{22} & v^2_{23} & v^2_{24} \end{bmatrix}^{-1} \begin{bmatrix} s^1_1 \\ s^1_2 \\ s^2_1 \\ s^2_2 \end{bmatrix} + \begin{bmatrix} n^1_1 \\ n^1_2 \\ n^2_1 \\ n^2_2 \end{bmatrix}$$

$$\begin{bmatrix} \begin{bmatrix} u^1_{11} & u^1_{12} & 0 \\ u^1_{21} & u^1_{22} & 0 \\ u^1_{31} & u^1_{32} & 0 \end{bmatrix}^H \begin{bmatrix} 000 \\ 000 \\ 000 \end{bmatrix} \\ \begin{bmatrix} 000 \\ 000 \\ 000 \end{bmatrix} \begin{bmatrix} u^2_{11} & u^2_{12} & 0 \\ u^2_{21} & u^2_{22} & 0 \\ u^2_{31} & u^2_{32} & 0 \end{bmatrix}^H \end{bmatrix}$$

$$\begin{bmatrix} y^1_1 \\ y^1_2 \\ y^1_3 \\ y^2_1 \\ y^2_2 \\ y^2_3 \end{bmatrix} = \begin{bmatrix} \begin{bmatrix} u^1_{11} & u^1_{12} & 0 \\ u^1_{21} & u^1_{22} & 0 \\ u^1_{31} & u^1_{32} & 0 \end{bmatrix}^H \begin{bmatrix} 000 \\ 000 \\ 000 \end{bmatrix} \\ \begin{bmatrix} 000 \\ 000 \\ 000 \end{bmatrix} \begin{bmatrix} u^2_{11} & u^2_{12} & 0 \\ u^2_{21} & u^2_{22} & 0 \\ u^2_{31} & u^2_{32} & 0 \end{bmatrix}^H \end{bmatrix} \begin{bmatrix} \begin{bmatrix} u^1_{11} & u^1_{12} & u^1_{13} \\ u^1_{21} & u^1_{22} & u^1_{23} \\ u^1_{31} & u^1_{32} & u^1_{33} \end{bmatrix} \begin{bmatrix} d^1_1 & 0 & 0 & 0 \\ 0 & d^1_2 & 0 & 0 \\ 0 & 0 & d^1_3 & 0 \end{bmatrix} \begin{bmatrix} 1000 \\ 0100 \\   \\   \end{bmatrix} \\ \begin{bmatrix} u^2_{11} & u^2_{12} & u^2_{13} \\ u^2_{21} & u^2_{22} & u^2_{23} \\ u^2_{31} & u^2_{32} & u^2_{33} \end{bmatrix} \begin{bmatrix} d^2_1 & 0 & 0 & 0 \\ 0 & d^2_2 & 0 & 0 \\ 0 & 0 & d^2_3 & 0 \end{bmatrix} \begin{bmatrix} 0010 \\ 0001 \\   \\   \end{bmatrix} \end{bmatrix} \begin{bmatrix} s^1_1 \\ s^1_2 \\ s^2_1 \\ s^2_2 \end{bmatrix} + \begin{bmatrix} n^1_1 \\ n^1_2 \\ n^2_1 \\ n^2_2 \end{bmatrix}$$

$$\begin{bmatrix} \begin{bmatrix} u^1_{11} & u^1_{12} & 0 \\ u^1_{21} & u^1_{22} & 0 \\ u^1_{31} & u^1_{32} & 0 \end{bmatrix}^H \begin{bmatrix} 000 \\ 000 \\ 000 \end{bmatrix} \\ \begin{bmatrix} 000 \\ 000 \\ 000 \end{bmatrix} \begin{bmatrix} u^2_{11} & u^2_{12} & 0 \\ u^2_{21} & u^2_{22} & 0 \\ u^2_{31} & u^2_{32} & 0 \end{bmatrix}^H \end{bmatrix} \begin{bmatrix} y^1_1 \\ y^1_2 \\ y^1_3 \\ y^2_1 \\ y^2_2 \\ y^2_3 \end{bmatrix} = \begin{bmatrix} \begin{bmatrix} 100 \\ 010 \\ 000 \end{bmatrix} \begin{bmatrix} d^1_1 & 0 & 0 & 0 \\ 0 & d^1_2 & 0 & 0 \\ 0 & 0 & d^1_3 & 0 \end{bmatrix} \begin{bmatrix} 1000 \\ 0100 \\   \\   \end{bmatrix} \\ \begin{bmatrix} 100 \\ 010 \\ 000 \end{bmatrix} \begin{bmatrix} d^2_1 & 0 & 0 & 0 \\ 0 & d^2_2 & 0 & 0 \\ 0 & 0 & d^2_3 & 0 \end{bmatrix} \begin{bmatrix} 0010 \\ 0001 \\   \\   \end{bmatrix} \end{bmatrix} \begin{bmatrix} s^1_1 \\ s^1_2 \\ s^2_1 \\ s^2_2 \end{bmatrix} + \begin{bmatrix} n^1_1 \\ n^1_2 \\ n^2_1 \\ n^2_2 \end{bmatrix}$$

$$= \begin{bmatrix} \begin{bmatrix} d^1_1 & 0 & 0 & 0 \\ 0 & d^1_2 & 0 & 0 \end{bmatrix} \begin{bmatrix} 1000 \\ 0100 \\   \\   \end{bmatrix} \\ \begin{bmatrix} d^2_1 & 0 & 0 & 0 \\ 0 & d^2_2 & 0 & 0 \end{bmatrix} \begin{bmatrix} 0010 \\ 0001 \\   \\   \end{bmatrix} \end{bmatrix} \begin{bmatrix} s^1_1 \\ s^1_2 \\ s^2_1 \\ s^2_2 \end{bmatrix} + \begin{bmatrix} n^1_1 \\ n^1_2 \\ n^2_1 \\ n^2_2 \end{bmatrix}$$

Further, Equation 7 represents the receive signal y when the single AP transmits data through four transmit antennas by the multi user-MIMO scheme, two terminals, that is, two STAs receive data through two receive antennas, and the data stream detected by the LQ decomposition scheme is two. In addition, as described above, the apparatuses for receiving data, that is the STAs feedbacks the Q matrix as the channel information regarding the data stream detected by the LQ decomposition scheme to the apparatus for transmitting data, that is, the AP. In this case, the AP performs the beamforming based on the Q matrix fedback to the channel information to transmit data to the STAs by the multi user-MIMO scheme, wherein the effective channel for transmitting data according to the beamforming becomes a matrix in a block diagonal matrix form. As described above, according to the effective channel having the block diagonal matrix form, the data receiving performance of the apparatuses for receiving data is more improved in the case in which the data stream is detected by the LQ decomposition scheme than the case in which the data stream is detected by the SVD scheme.

data, that is, the STAs feedbacks the Q matrix as the channel information regarding the data stream detected by the LQ decomposition scheme to the apparatus for transmitting data, that is, the AP. In this case, the AP performs the beamforming based on the Q matrix fedback to the channel information to transmit data to the STAs by the multi user-MIMO scheme, wherein the effective channel for transmitting data according to the beamforming becomes a matrix in a block diagonal matrix form. As described above, according to the effective channel having the block diagonal matrix form, the data receiving performance of the apparatuses for receiving data is more improved in the case in which the data stream is detected

[Equation7]

$$\begin{bmatrix} y_1^1 \\ y_2^1 \\ y_1^2 \\ y_2^2 \end{bmatrix} = \begin{bmatrix} h_{11}^1 & h_{12}^1 & h_{13}^1 & h_{14}^1 \\ h_{21}^1 & h_{22}^1 & h_{23}^1 & h_{24}^1 \\ h_{11}^2 & h_{12}^2 & h_{13}^2 & h_{14}^2 \\ h_{21}^2 & h_{22}^2 & h_{23}^2 & h_{24}^2 \end{bmatrix} \begin{bmatrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{bmatrix} \begin{bmatrix} s_1^1 \\ s_2^1 \\ s_1^2 \\ s_2^2 \end{bmatrix} + \begin{bmatrix} n_1^1 \\ n_2^1 \\ n_1^2 \\ n_2^2 \end{bmatrix}$$

$$= \begin{bmatrix} \begin{bmatrix} l_{11}^1 & 0 & 0 & 0 \\ l_{21}^1 & l_{22}^1 & 0 & 0 \end{bmatrix} \begin{bmatrix} q_{11}^1 & q_{12}^1 & q_{13}^1 & q_{14}^1 \\ q_{21}^1 & q_{22}^1 & q_{23}^1 & q_{24}^1 \\ q_{31}^1 & q_{32}^1 & q_{33}^1 & q_{34}^1 \\ q_{41}^1 & q_{42}^1 & q_{43}^1 & q_{44}^1 \end{bmatrix} \\ \begin{bmatrix} l_{11}^2 & 0 & 0 & 0 \\ l_{21}^2 & l_{22}^2 & 0 & 0 \end{bmatrix} \begin{bmatrix} q_{11}^2 & q_{12}^2 & q_{13}^2 & q_{14}^2 \\ q_{21}^2 & q_{22}^2 & q_{23}^2 & q_{24}^2 \\ q_{31}^2 & q_{32}^2 & q_{33}^2 & q_{34}^2 \\ q_{41}^2 & q_{42}^2 & q_{43}^2 & q_{44}^2 \end{bmatrix} \end{bmatrix} \begin{bmatrix} \begin{bmatrix} q_{11}^1 & q_{12}^1 & q_{13}^1 & q_{14}^1 \\ q_{21}^1 & q_{22}^1 & q_{23}^1 & q_{24}^1 \end{bmatrix} \\ \begin{bmatrix} q_{11}^2 & q_{12}^2 & q_{13}^2 & q_{14}^2 \\ q_{21}^2 & q_{22}^2 & q_{23}^2 & q_{24}^2 \end{bmatrix} \end{bmatrix}^{-1} \begin{bmatrix} s_1^1 \\ s_2^1 \\ s_1^2 \\ s_2^2 \end{bmatrix} + \begin{bmatrix} n_1^1 \\ n_2^1 \\ n_1^2 \\ n_2^2 \end{bmatrix}$$

$$\begin{bmatrix} y_1^1 \\ y_2^1 \\ y_1^2 \\ y_2^2 \end{bmatrix} = \begin{bmatrix} \begin{bmatrix} l_{11}^1 & 0 & 0 & 0 \\ l_{21}^1 & l_{22}^1 & 0 & 0 \end{bmatrix} \begin{bmatrix} 1000 \\ 0100 \\   \\   \end{bmatrix} \\ \begin{bmatrix} l_{11}^2 & 0 & 0 & 0 \\ l_{21}^2 & l_{22}^2 & 0 & 0 \end{bmatrix} \begin{bmatrix} 0010 \\ 0001 \\   \\   \end{bmatrix} \end{bmatrix} \begin{bmatrix} s_1^1 \\ s_2^1 \\ s_1^2 \\ s_2^2 \end{bmatrix} + \begin{bmatrix} n_1^1 \\ n_2^1 \\ n_1^2 \\ n_2^2 \end{bmatrix}$$

$$= \begin{bmatrix} \begin{bmatrix} l_{11}^1 & 0 & 0 & 0 \\ l_{21}^1 & l_{22}^1 & 0 & 0 \\ 0 & 0 & l_{11}^2 & 0 \\ 0 & 0 & l_{21}^2 & l_{22}^2 \end{bmatrix} \end{bmatrix} \begin{bmatrix} s_1^1 \\ s_2^1 \\ s_1^2 \\ s_2^2 \end{bmatrix} + \begin{bmatrix} n_1^1 \\ n_2^1 \\ n_1^2 \\ n_2^2 \end{bmatrix}$$

Further, Equation 8 represents the receive signal y when the single AP transmits data through four transmit antennas by the multi user-MIMO scheme, two terminals, that is, two STAs receive data through three receive antennas, and the data stream detected by the LQ decomposition scheme is two. In addition, as described above, the apparatuses for receiving by the LQ decomposition scheme than the case in which the data stream is detected by the SVD scheme. Here, the STAs, that is, the apparatuses for receiving data previously perform receive chain selection, in other words, receive antenna selection. In this case, when the antenna selection is performed for per-tone, a selection index is previously stored.

[Equation 8]

$$\begin{bmatrix} y_1^1 \\ y_2^1 \\ y_1^2 \\ y_2^2 \\ y_3^2 \end{bmatrix} = \begin{bmatrix} h_{11}^1 & h_{12}^1 & h_{13}^1 & h_{14}^1 \\ h_{21}^1 & h_{22}^1 & h_{23}^1 & h_{24}^1 \\ h_{31}^1 & h_{32}^1 & h_{33}^1 & h_{34}^1 \\ h_{11}^2 & h_{12}^2 & h_{13}^2 & h_{14}^2 \\ h_{21}^2 & h_{22}^2 & h_{23}^2 & h_{24}^2 \\ h_{31}^2 & h_{32}^2 & h_{33}^2 & h_{34}^2 \end{bmatrix} \begin{bmatrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{bmatrix} \begin{bmatrix} s_1^1 \\ s_2^1 \\ s_1^2 \\ s_2^2 \end{bmatrix} + \begin{bmatrix} n_1^1 \\ n_2^1 \\ n_1^2 \\ n_2^2 \end{bmatrix}$$

$$= \begin{bmatrix} \begin{bmatrix} l_{11}^1 & 0 & 0 & 0 \\ l_{21}^1 & l_{22}^1 & 0 & 0 \\ l_{31}^1 & l_{32}^1 & l_{33}^1 & 0 \end{bmatrix} \begin{bmatrix} q_{11}^1 & q_{12}^1 & q_{13}^1 & q_{14}^1 \\ q_{21}^1 & q_{22}^1 & q_{23}^1 & q_{24}^1 \\ q_{31}^1 & q_{32}^1 & q_{33}^1 & q_{34}^1 \\ q_{41}^1 & q_{42}^1 & q_{43}^1 & q_{44}^1 \end{bmatrix} \\ \begin{bmatrix} l_{11}^2 & 0 & 0 & 0 \\ l_{21}^2 & l_{22}^2 & 0 & 0 \\ l_{31}^2 & l_{32}^2 & l_{33}^2 & 0 \end{bmatrix} \begin{bmatrix} q_{11}^2 & q_{12}^2 & q_{13}^2 & q_{14}^2 \\ q_{21}^2 & q_{22}^2 & q_{23}^2 & q_{24}^2 \\ q_{31}^2 & q_{32}^2 & q_{33}^2 & q_{34}^2 \\ q_{41}^2 & q_{42}^2 & q_{43}^2 & q_{44}^2 \end{bmatrix} \end{bmatrix} \begin{bmatrix} \begin{bmatrix} q_{11}^1 & q_{12}^1 & q_{13}^1 & q_{14}^1 \\ q_{21}^1 & q_{22}^1 & q_{23}^1 & q_{24}^1 \end{bmatrix} \\ \begin{bmatrix} q_{11}^2 & q_{12}^2 & q_{13}^2 & q_{14}^2 \\ q_{21}^2 & q_{22}^2 & q_{23}^2 & q_{24}^2 \end{bmatrix} \end{bmatrix}^{-1} \begin{bmatrix} s_1^1 \\ s_2^1 \\ s_1^2 \\ s_2^2 \end{bmatrix} + \begin{bmatrix} n_1^1 \\ n_2^1 \\ n_1^2 \\ n_2^2 \end{bmatrix}$$

$$\begin{bmatrix} \begin{bmatrix} 100 \\ 010 \\ 000 \end{bmatrix} & \begin{bmatrix} 000 \\ 000 \\ 000 \end{bmatrix} \\ \begin{bmatrix} 000 \\ 000 \\ 000 \end{bmatrix} & \begin{bmatrix} 100 \\ 010 \\ 000 \end{bmatrix} \end{bmatrix} \begin{bmatrix} y_1^1 \\ y_2^1 \\ y_3^1 \\ y_1^2 \\ y_2^2 \\ y_3^2 \end{bmatrix} = \begin{bmatrix} \begin{bmatrix} 100 \\ 010 \\ 000 \end{bmatrix} & \begin{bmatrix} 000 \\ 000 \\ 000 \end{bmatrix} \\ \begin{bmatrix} 000 \\ 000 \\ 000 \end{bmatrix} & \begin{bmatrix} 100 \\ 010 \\ 000 \end{bmatrix} \end{bmatrix} \begin{bmatrix} \begin{bmatrix} l_{11}^1 & 0 & 0 & 0 \\ l_{21}^1 & l_{22}^1 & 0 & 0 \\ l_{31}^1 & l_{32}^1 & l_{33}^1 & 0 \end{bmatrix} \begin{bmatrix} 1000 \\ 0100 \\   \\   \end{bmatrix} \\ \begin{bmatrix} l_{11}^2 & 0 & 0 & 0 \\ l_{21}^2 & l_{22}^2 & 0 & 0 \\ l_{31}^2 & l_{32}^2 & l_{33}^2 & 0 \end{bmatrix} \begin{bmatrix} 0010 \\ 0001 \\   \\   \end{bmatrix} \end{bmatrix} \begin{bmatrix} s_1^1 \\ s_2^1 \\ s_1^2 \\ s_2^2 \end{bmatrix} + \begin{bmatrix} n_1^1 \\ n_2^1 \\ n_1^2 \\ n_2^2 \end{bmatrix}$$

$$= \begin{bmatrix} \begin{bmatrix} l_{11}^1 & 0 & 0 & 0 \\ l_{21}^1 & l_{22}^1 & 0 & 0 \end{bmatrix} \begin{bmatrix} 1000 \\ 0100 \\   \\   \end{bmatrix} \\ \begin{bmatrix} l_{11}^2 & 0 & 0 & 0 \\ l_{21}^2 & l_{22}^2 & 0 & 0 \end{bmatrix} \begin{bmatrix} 0010 \\ 0001 \\   \\   \end{bmatrix} \end{bmatrix} \begin{bmatrix} s_1^1 \\ s_2^1 \\ s_1^2 \\ s_2^2 \end{bmatrix} + \begin{bmatrix} n_1^1 \\ n_2^1 \\ n_1^2 \\ n_2^2 \end{bmatrix}$$

Hereinafter, the data receiving performing of the apparatus for receiving data by the SVD scheme and the LQ decomposition scheme in accordance with the embodiment of the present invention will be described in more detail with reference to FIGS. 3 to 26.

FIGS. 3 to 26 are diagrams schematically illustrating performance of an apparatus for receiving data in the communication system in accordance with an embodiment of the present invention; Here, FIGS. 3 to 26 illustrate the data receiving performance of the apparatus for receiving data detecting the data stream using the SVD scheme and the LQ decomposition scheme, for example, the apparatus for receiving data according to the ML scheme. In particular, FIGS. 3 to 26 illustrate that the data receiving performance of the apparatus for receiving data according to the ML scheme detecting the data stream using the SVD scheme and the LQ decomposition scheme is represented by a packet error ratio (hereinafter, referred to as 'PER') and a signal-to-noise ratio (hereinafter, referred to as 'SNR') when the apparatus for transmitting data transmits data through 1 to 8 transmit antennas by the single user-MIMO scheme and the multi user-MIMO scheme.

Figure 3:
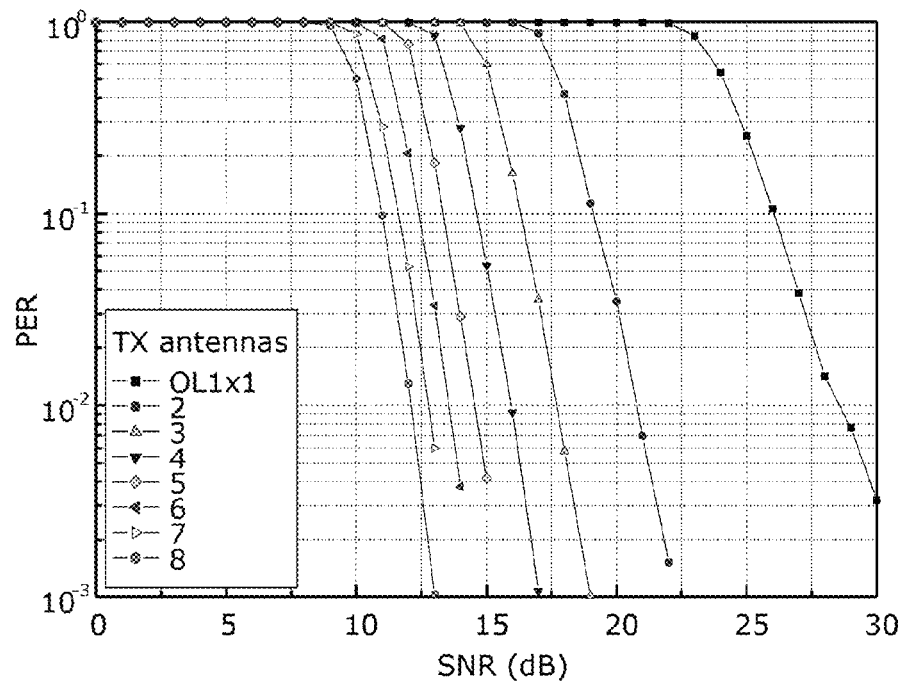
FIGS. 3 to 26 are diagrams schematically illustrating performance of an apparatus for receiving data in the communication system in accordance with an embodiment of the present invention.
Figure 4:
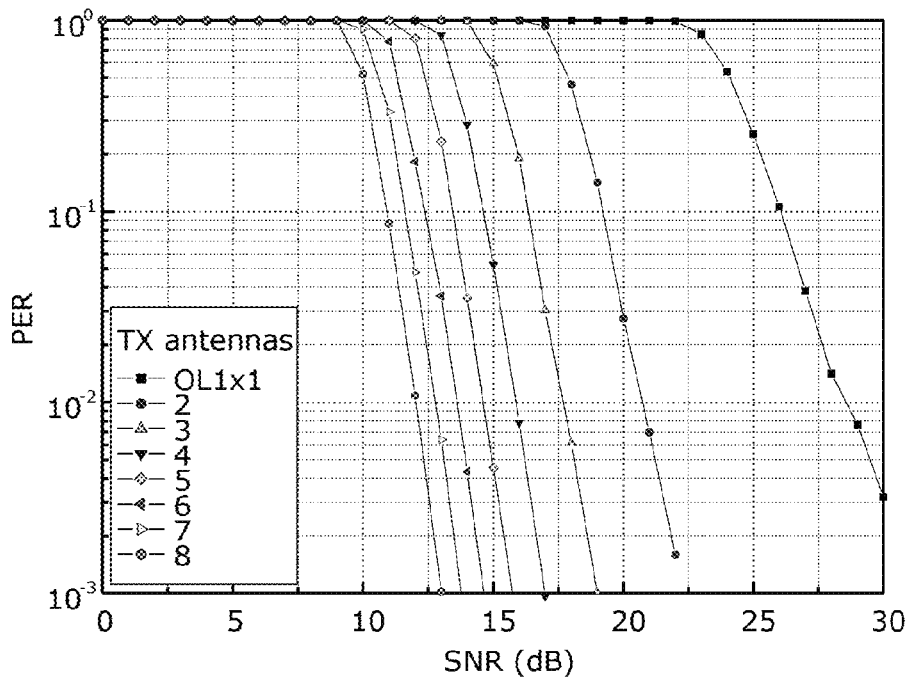

Describing in more detail, FIG. 3 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through the single receive antenna, the data stream detected by the SVD scheme is one, and the V matrix as the channel information data stream is fedback according to the SVD scheme. Further, FIG. 4 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through the single receive antenna, the data stream detected by the LQ decomposition scheme is one, and the Q matrix as the channel information data stream is fedback according to the LQ decomposition scheme.

Figure 5:
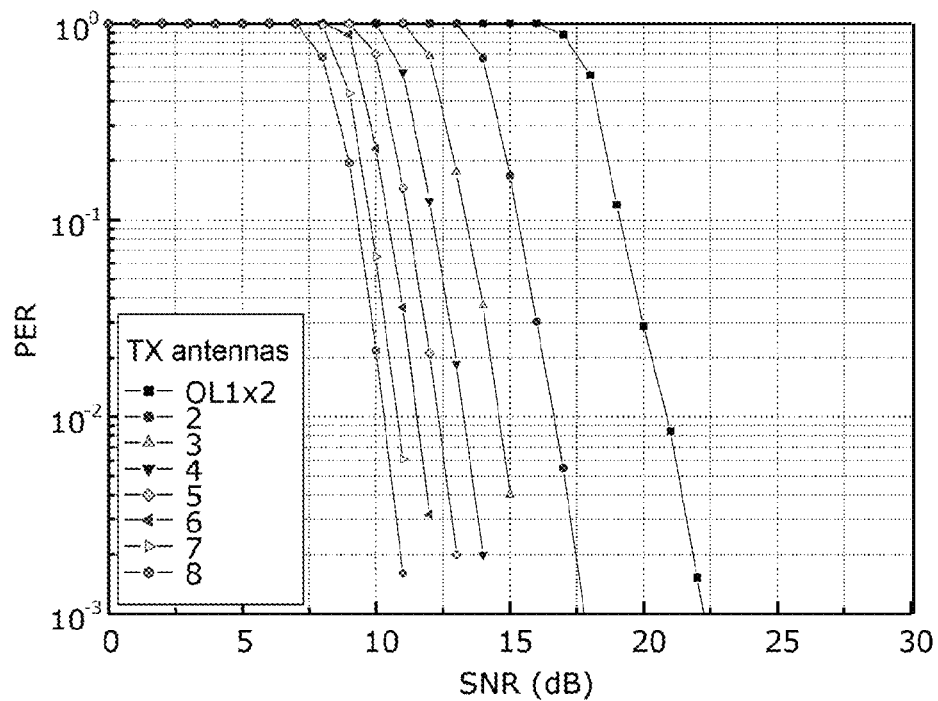
Figure 6:
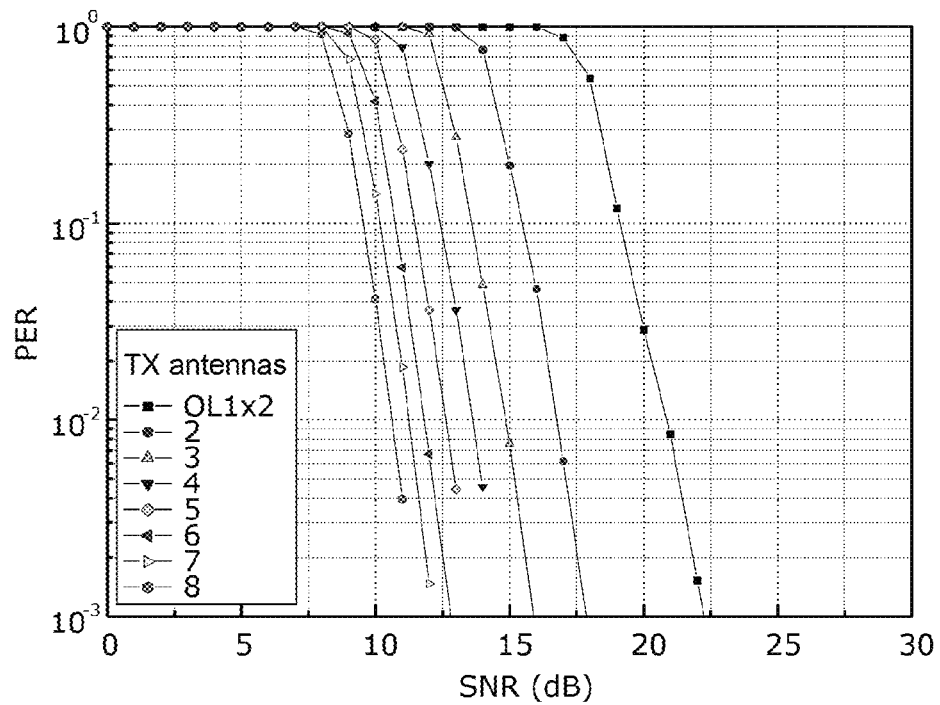

In addition, FIG. 5 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through two receive antennas, the data stream detected by the SVD scheme is one, and the V matrix as the channel information data stream is fedback according to the SVD scheme. Further, FIG. 6 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through two receive antennas, the data stream detected by the LQ decomposition scheme is one, and the Q matrix as the channel information data stream is fedback according to the LQ decomposition scheme.

Figure 7:
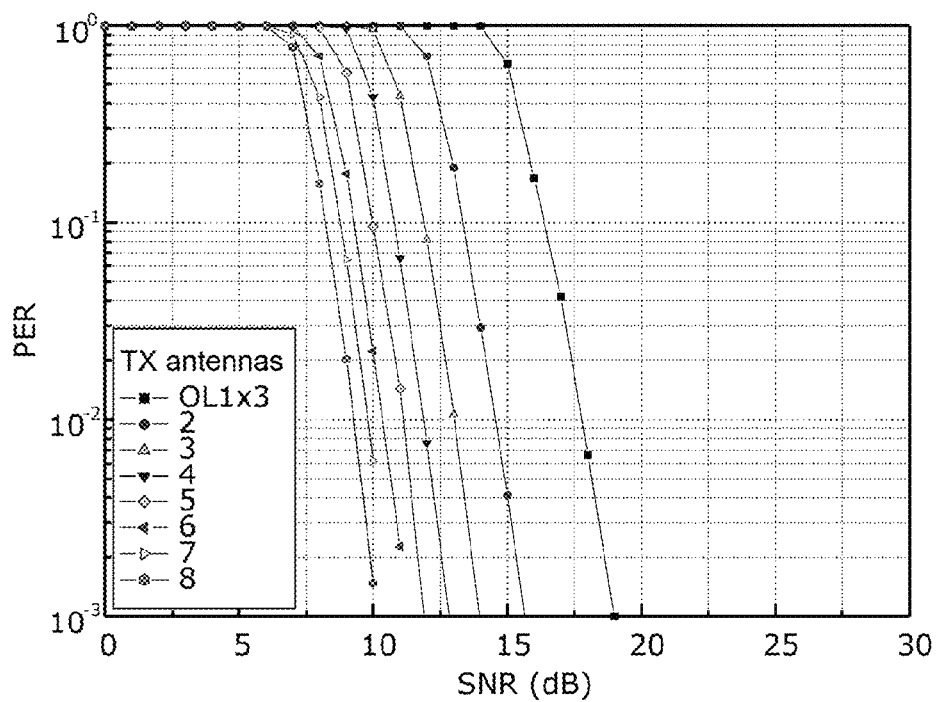
Figure 8:
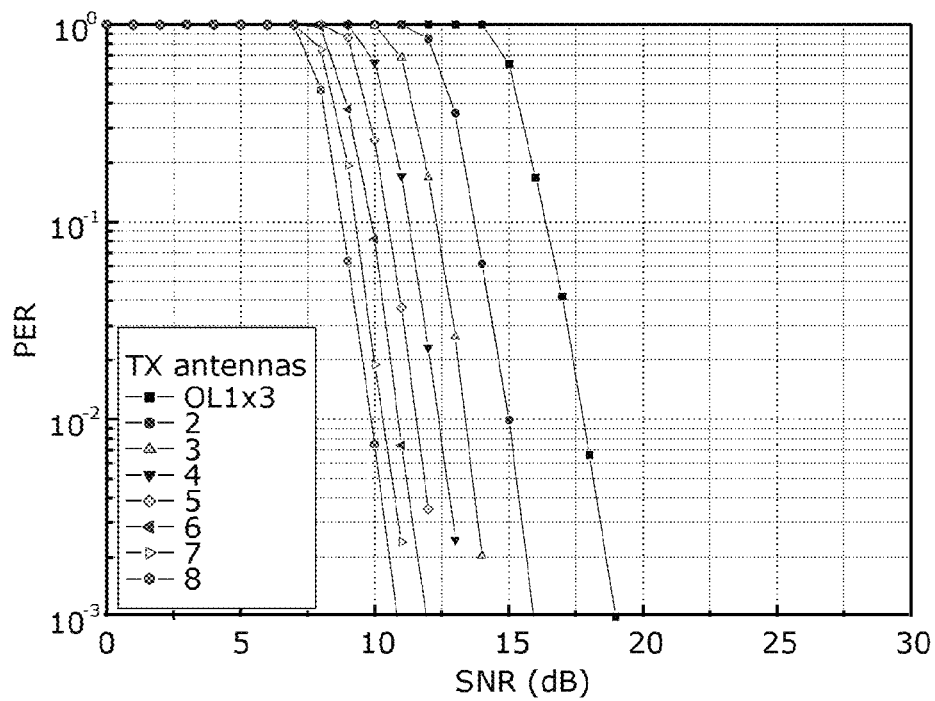

In addition, FIG. 7 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through three receive antennas, the data stream detected by the SVD scheme is one, and the V matrix as the channel information data stream is fedback according to the SVD scheme. Further, FIG. 8 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through three receive antennas, the data stream detected by the LQ decomposition scheme is one, and the Q matrix as the channel information data stream is fedback according to the LQ decomposition scheme.

Figure 9:
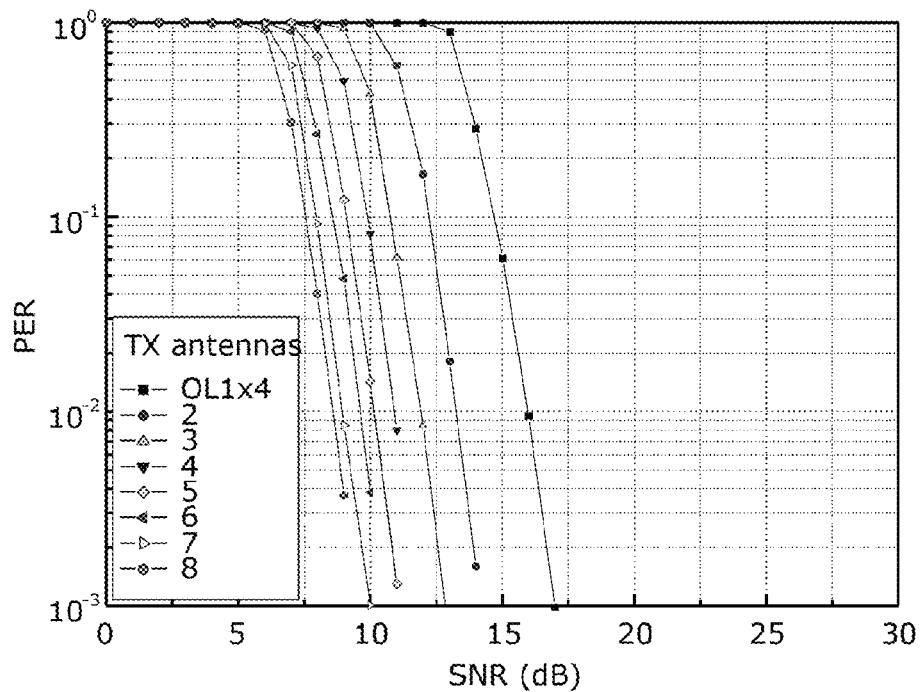
Figure 10:
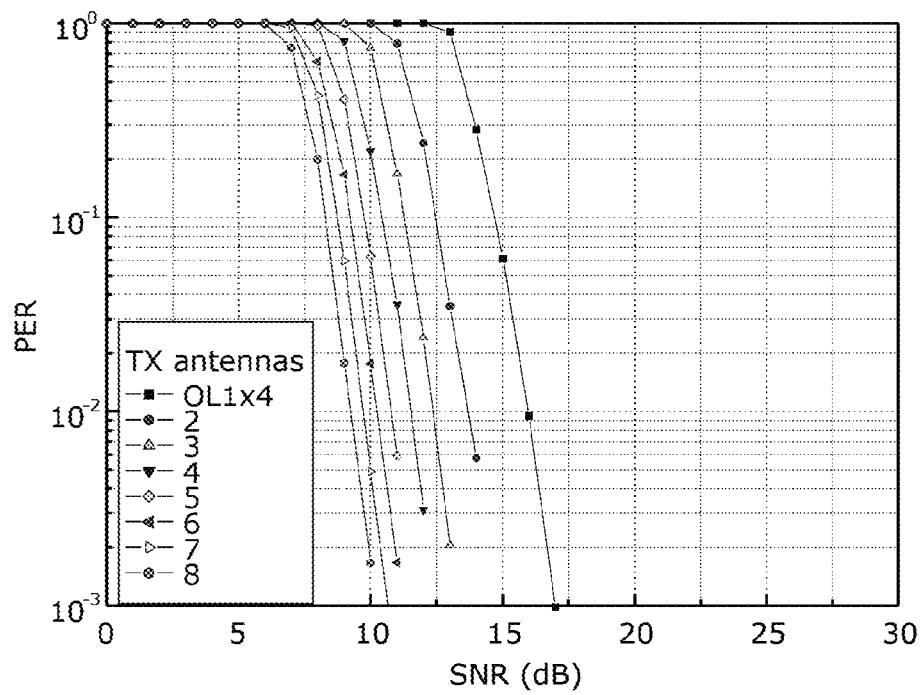

In addition, FIG. 9 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through four receive antennas, the data stream detected by the SVD scheme is one, and the V matrix as the channel information data stream is fedback according to the SVD scheme. Further, FIG. 10 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through four receive antennas, the data stream detected by the LQ decomposition scheme is one, and the Q matrix as the channel information data stream is fedback according to the LQ decomposition scheme.

Figure 11:
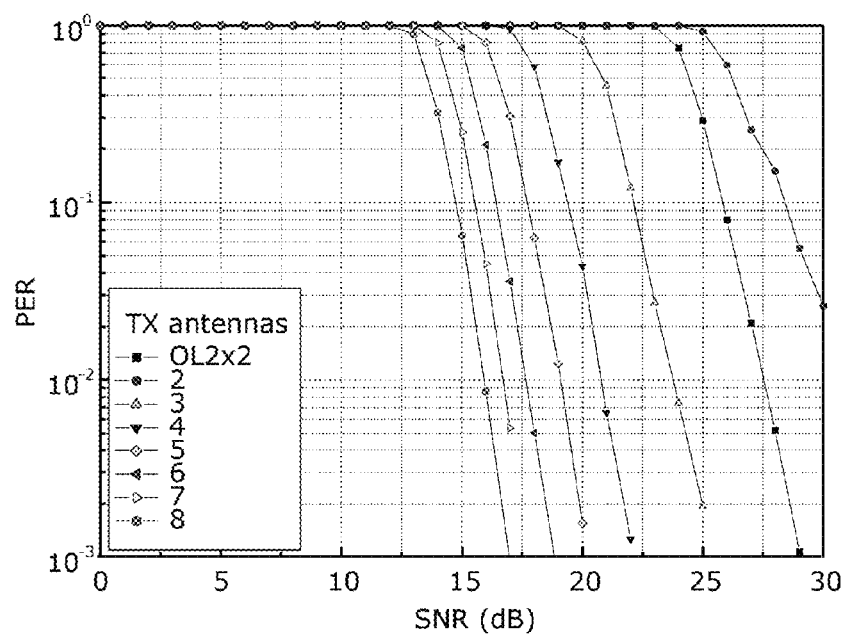
Figure 12:
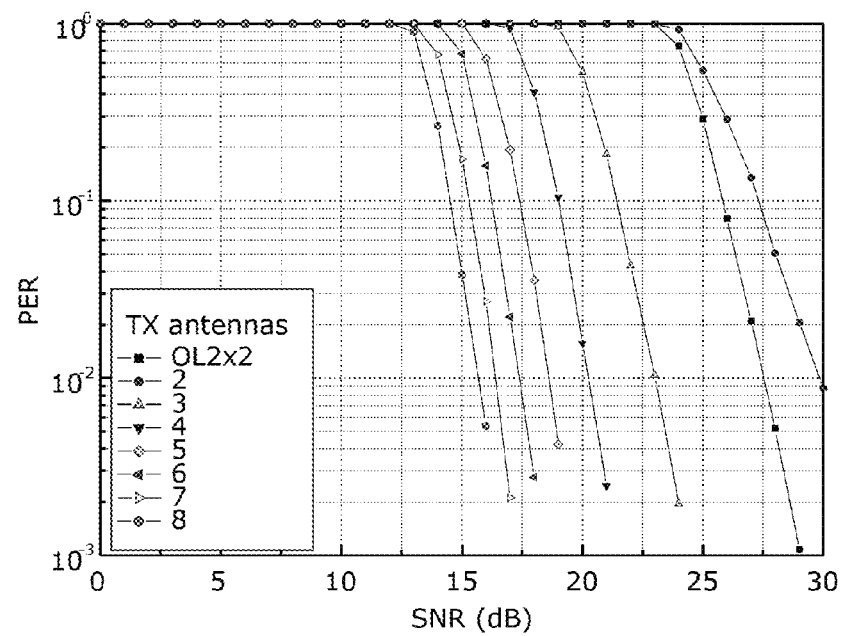

In addition, FIG. 11 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through two receive antennas, the data stream detected by the SVD scheme is two, and the V matrix as the channel information data stream is fedback according to the SVD scheme. Further, FIG. 12 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through two receive antennas, the data stream detected by the LQ decomposition scheme is two, and the Q matrix as the channel information data stream is fedback according to the LQ decomposition scheme.

Figure 13:
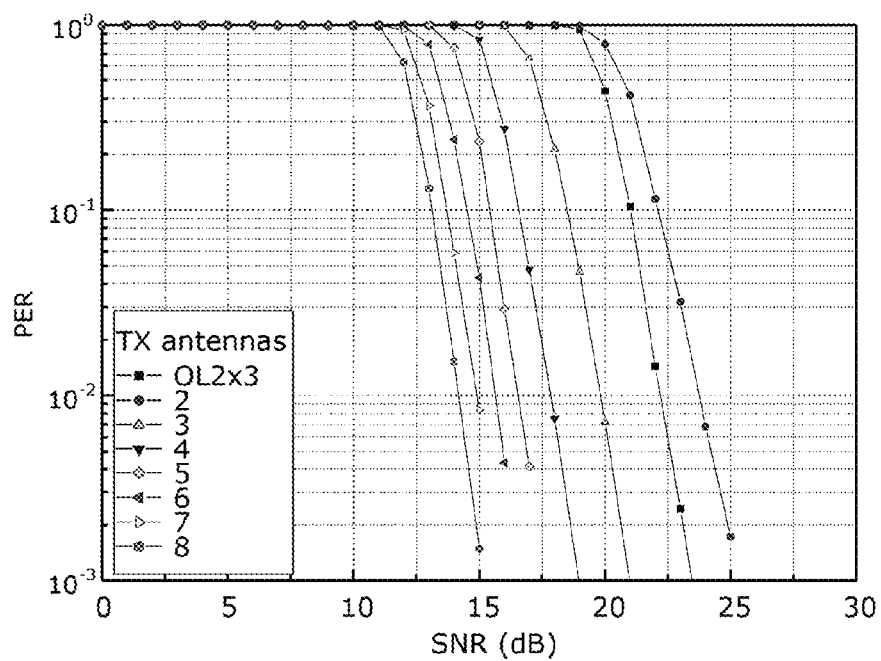
Figure 14:
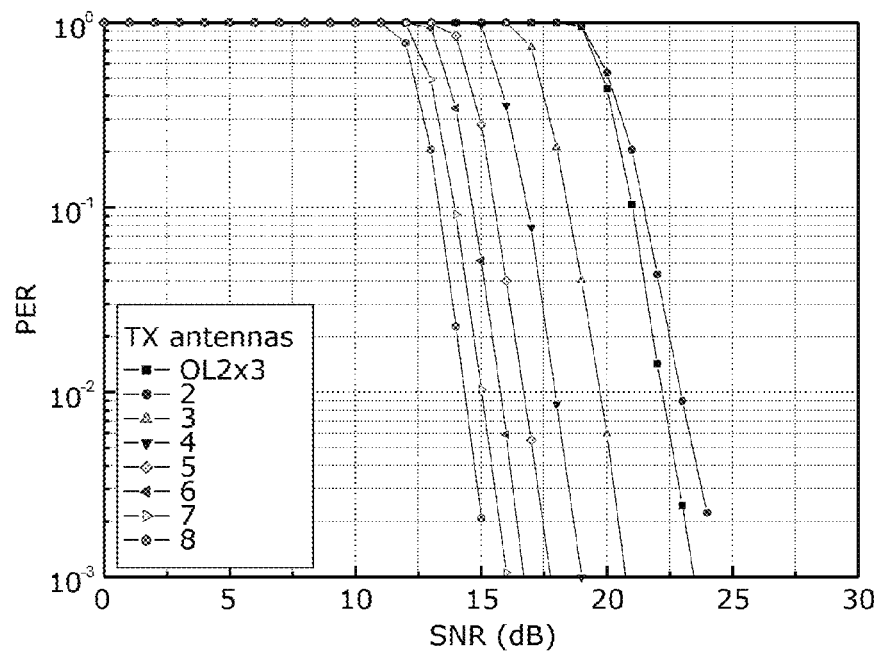

In addition, FIG. 13 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through three receive antennas, the data stream detected by the SVD scheme is one, and the V matrix as the channel information data stream is fedback according to the SVD scheme. Further, FIG. 14 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through three receive antennas, the data stream detected by the LQ decomposition scheme is two, and the Q matrix as the channel information data stream is fedback according to the LQ decomposition scheme.

Figure 15:
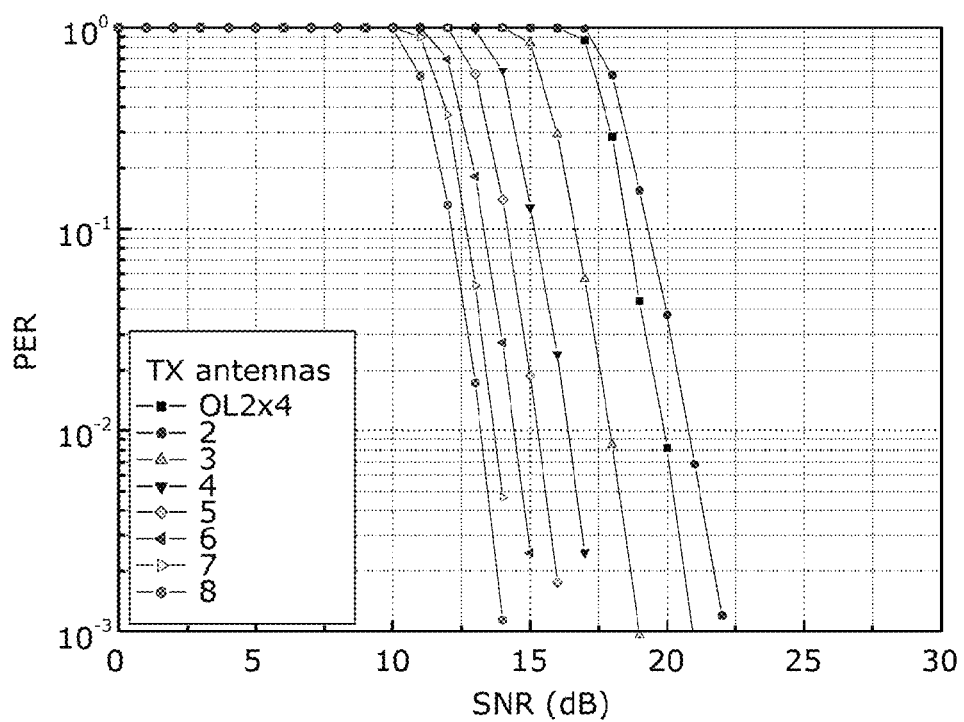
Figure 16:
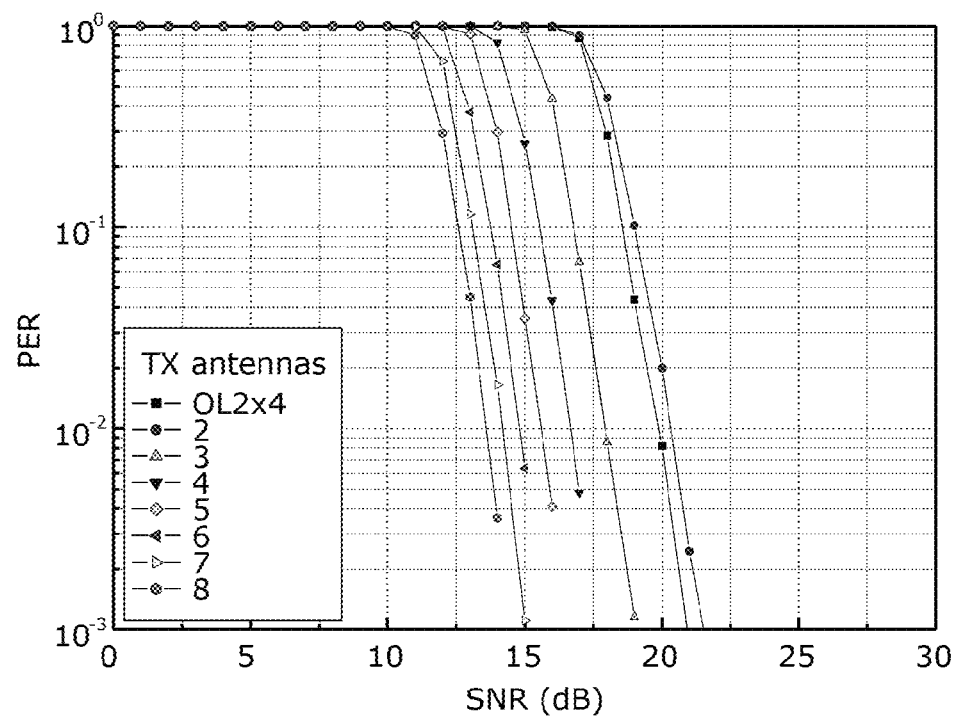

In addition, FIG. 15 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through four receive antennas, the data stream detected by the SVD scheme is one, and the V matrix as the channel information data stream is fedback according to the SVD scheme. Further, FIG. 16 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through four receive antennas, the data stream detected by the LQ decomposition scheme is one, and the Q matrix as the channel information data stream is fedback according to the LQ decomposition scheme.

Figure 17:
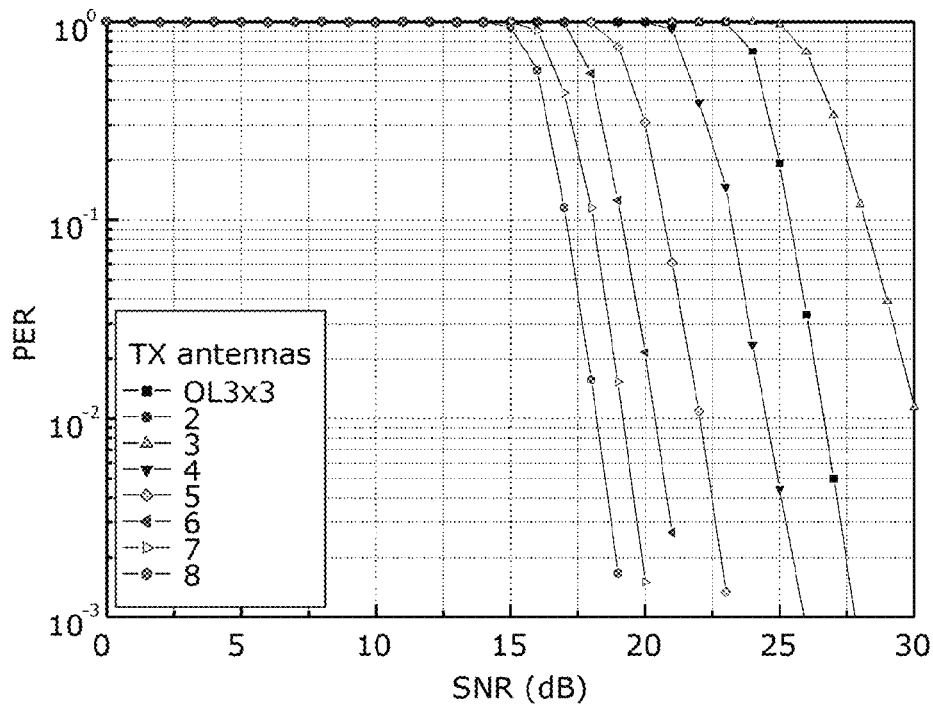
Figure 18:
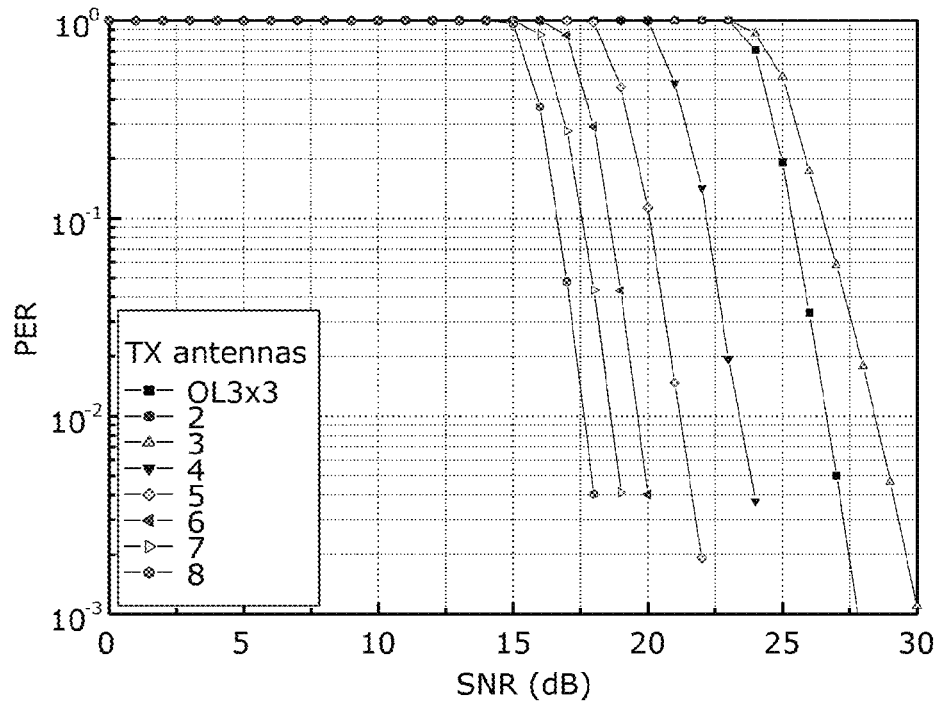

In addition, FIG. 17 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through three receive antennas, the data stream detected by the SVD scheme is three, and the V matrix as the channel information data stream is fedback according to the SVD scheme. Further, FIG. 18 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through three receive antennas, the data stream detected by the LQ decomposition scheme is one, and the Q matrix as the channel information data stream is fedback according to the LQ decomposition scheme.

Figure 19:
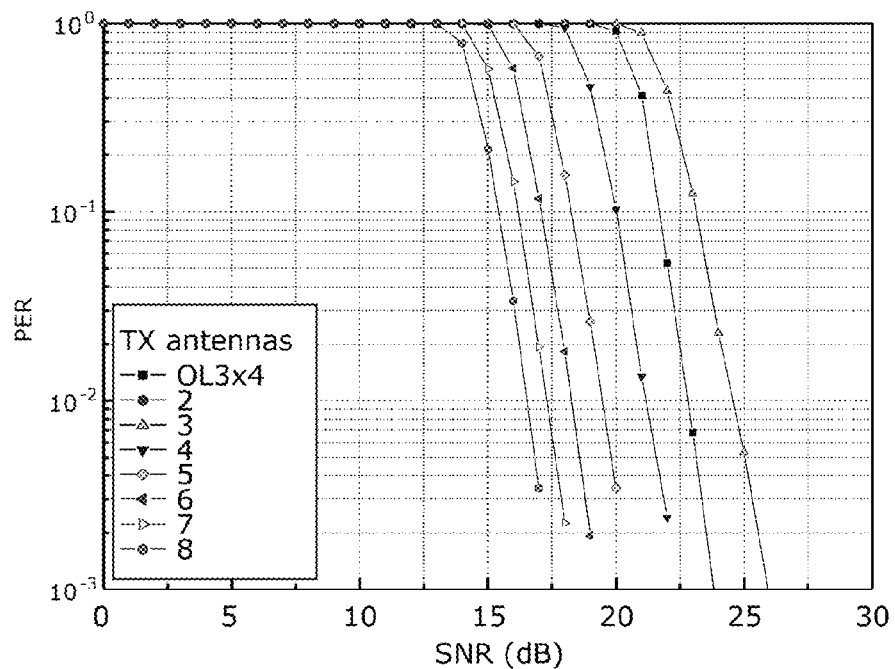
Figure 20:
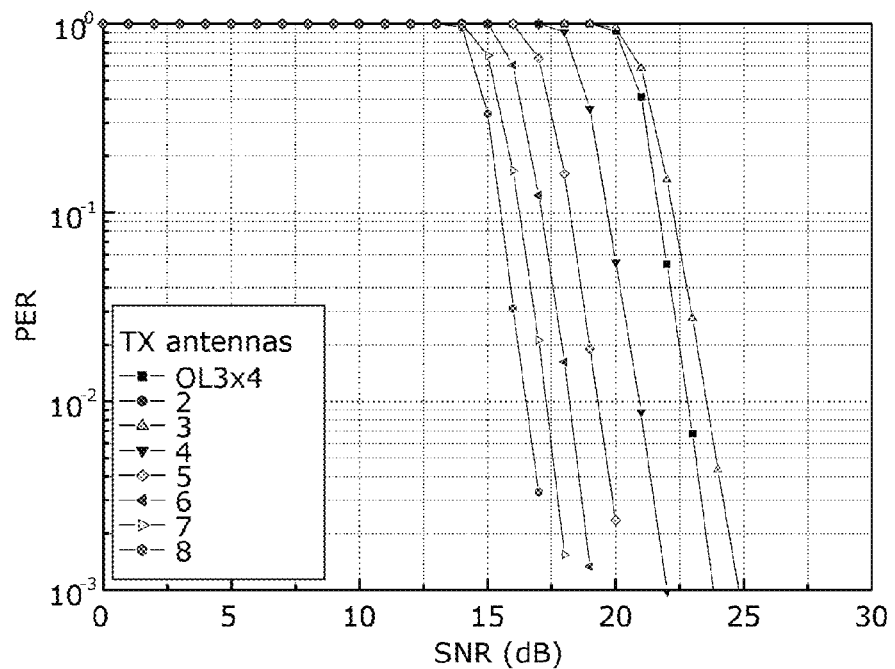

In addition, FIG. 19 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through four receive antennas, the data stream detected by the SVD scheme is three, and the V matrix as the channel information data stream is fedback according to the SVD scheme. Further, FIG. 20 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through four receive antennas, the data stream detected by the LQ decomposition scheme is three, and the Q matrix as the channel information data stream is fedback according to the LQ decomposition scheme.

Figure 21:
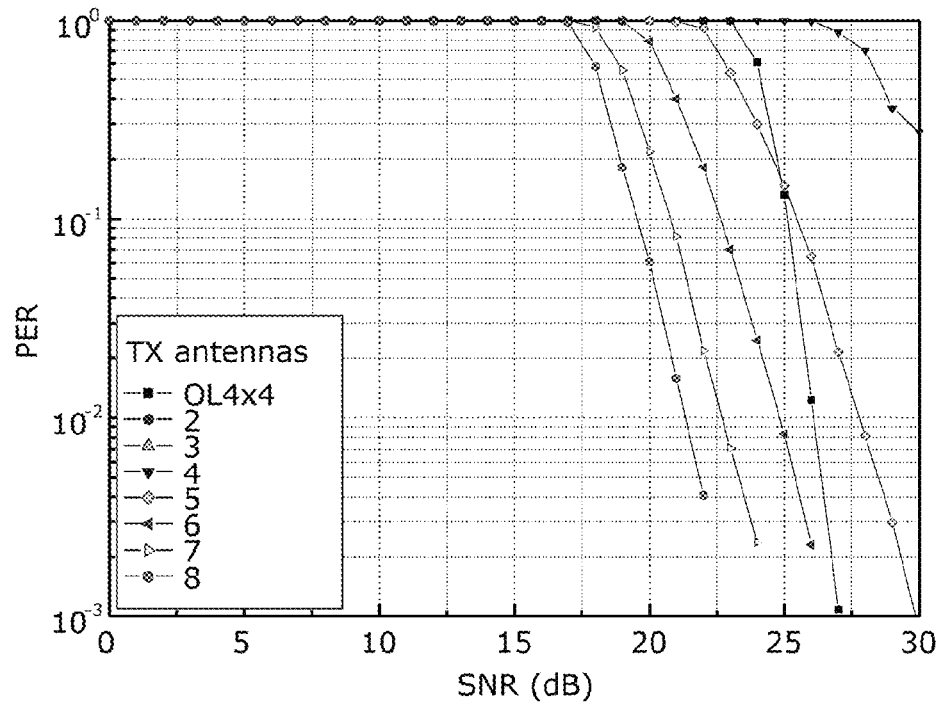
Figure 22:
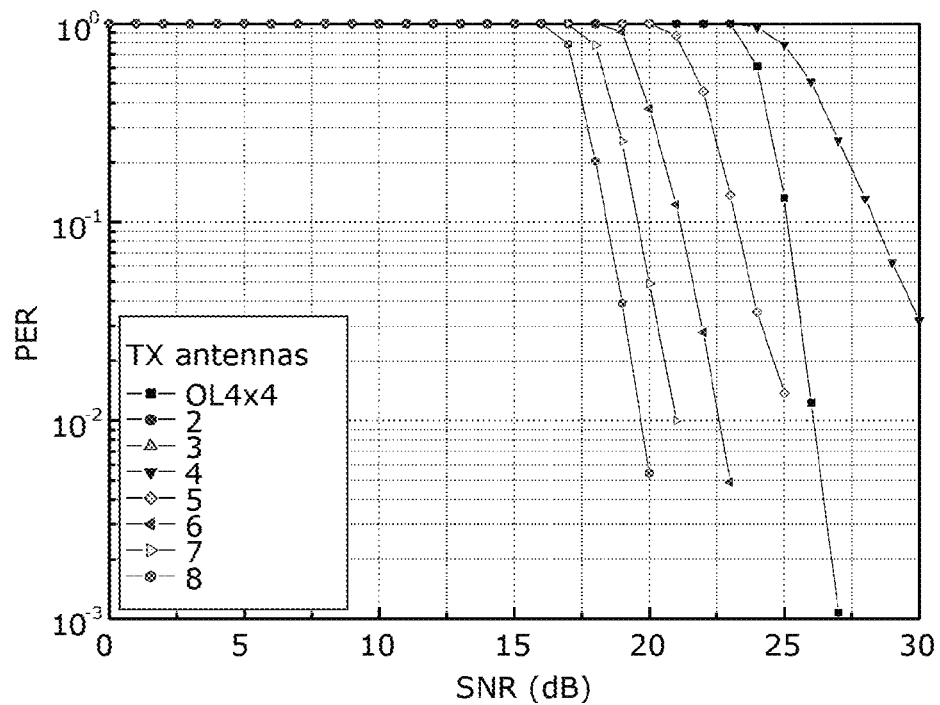

In addition, FIG. 21 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through four receive antennas, the data stream detected by the SVD scheme is four, and the V matrix as the channel information data stream is fedback according to the SVD scheme. Further, FIG. 22 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data through four receive antenna, the data stream detected by the LQ scheme is four, and the Q matrix as the channel information data stream is fedback according to the LQ scheme.

Figure 23:
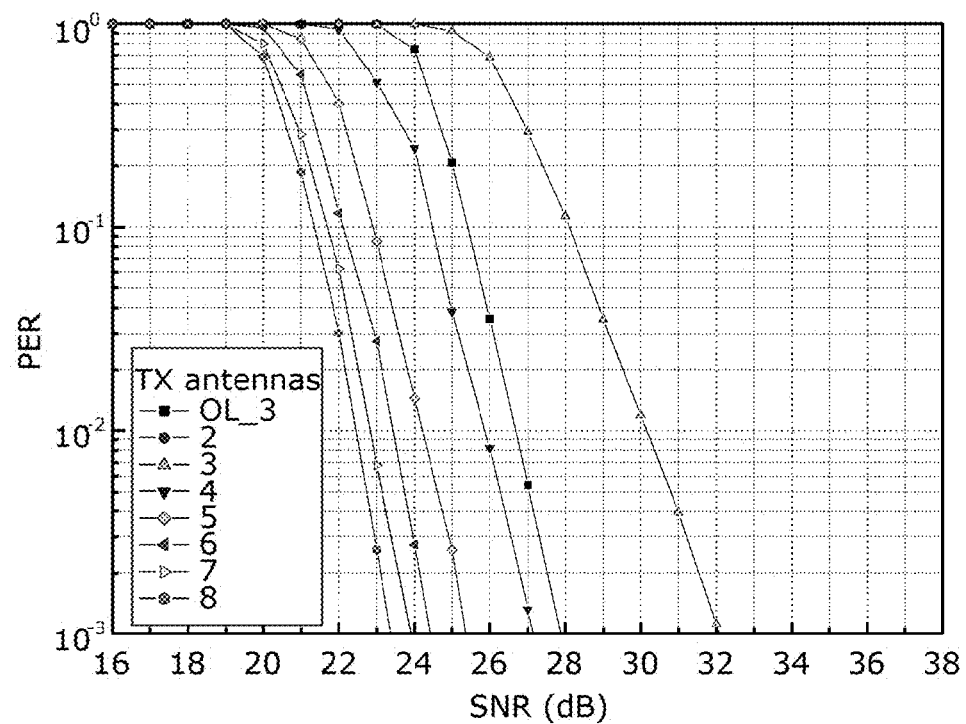
Figure 24:
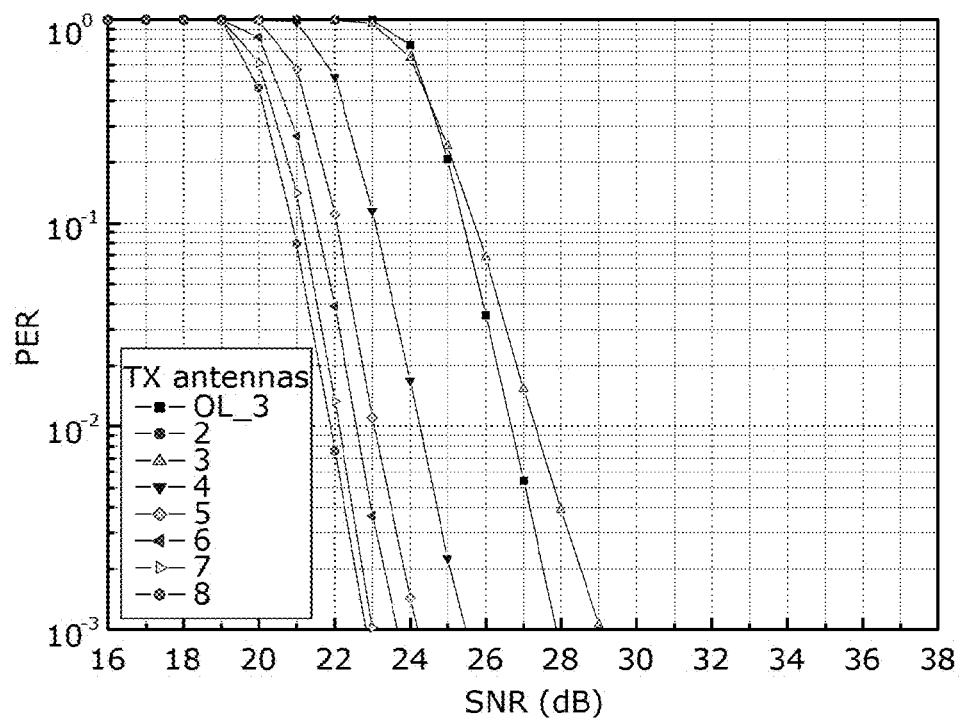

In addition, FIG. 23 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data, the data stream detected by the SVD scheme is three, and the V matrix as the channel information data stream is fedback according to the SVD scheme. Further, FIG. 24 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data, the data stream detected by the LQ decomposition scheme is three, and the Q matrix as the channel information data stream is fedback according to the LQ decomposition scheme.

Figure 25:
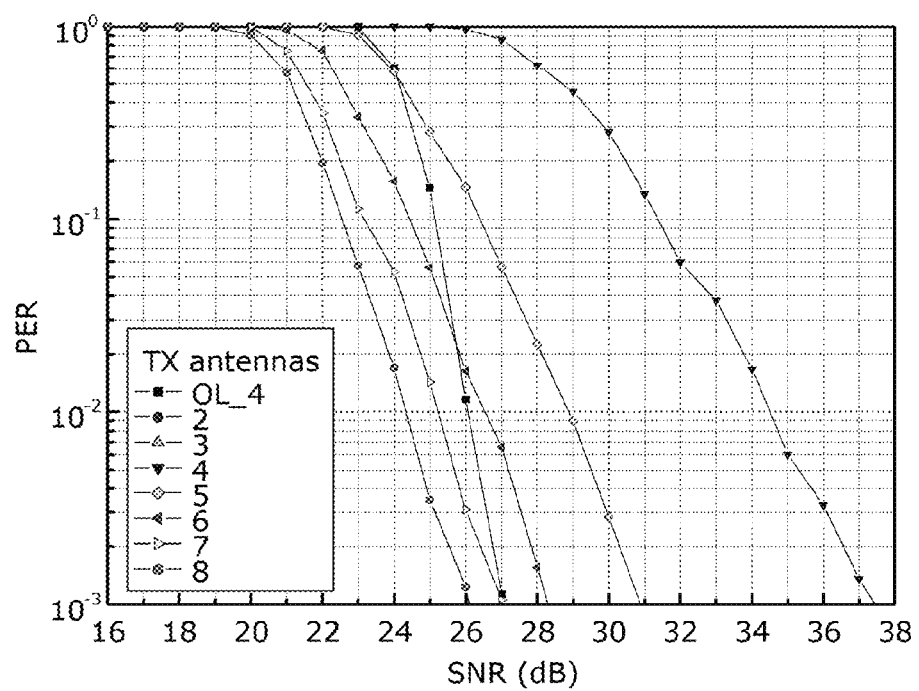
Figure 26:
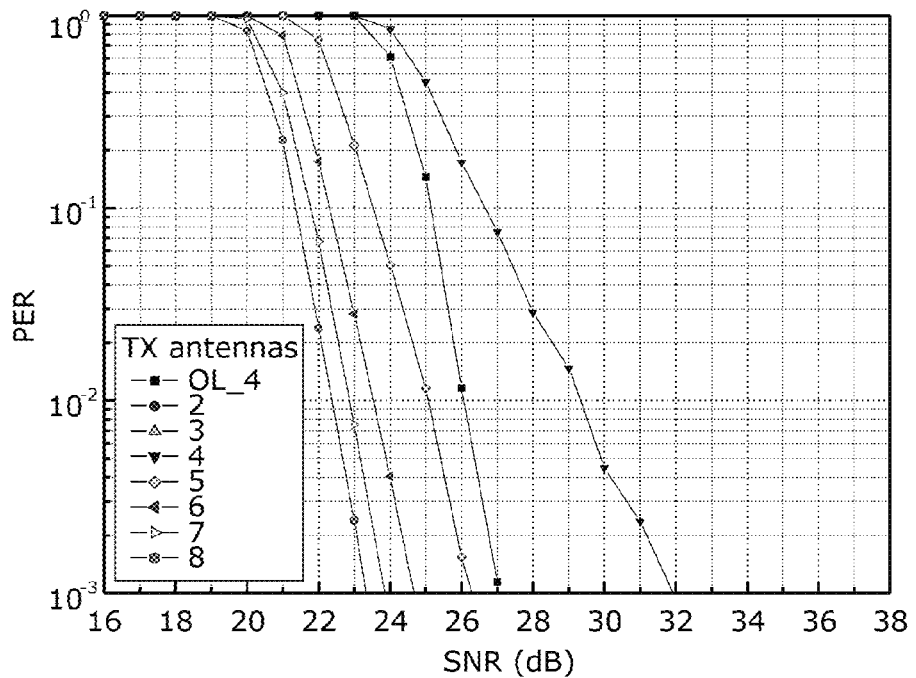

In addition, FIG. 25 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data, the data stream detected by the SVD scheme is four, and the V matrix as the channel information data stream is fedback according to the SVD scheme. Further, FIG. 26 is a graph illustrating the data receiving performance of the apparatus for receiving data, that is, the PER and the SNR for each transmit antenna when the apparatus for transmitting data transmits the data through the 1 to 8 transmit antennas (TX antennas) by the MIMO scheme, the apparatus for receiving data receives data, the data stream detected by the LQ decomposition scheme is four, and the Q matrix as the channel information data stream is fedback according to the LQ decomposition scheme.

As illustrated in FIGS. 3 to 26, the data receiving performance of the apparatus for receiving data, that is, the data detection performance of the ML scheme of the apparatus for receiving data is improved and the data receiving performance is improved accordingly, in the case in which the Q matrix is fedback as the channel information by detecting the data stream by the LQ decomposition scheme than in the case in which the V matrix is fedback as the channel information by detecting the data stream by the SVD scheme.

The exemplary embodiments of the present invention can normally feedback the channel information regarding the data stream by feedbacking by the LQ decomposition scheme the channel information regarding the data stream of the large-capacity data transmitted and received by the single user-MIMO scheme and the multi user-MIMO scheme in the communication system, thereby stably transmitting and receiving at high rate the large-capacity data by the single user-MIMO scheme and the multi user-MIMO scheme using the limited resources.

While the present invention has been described with respect to the specific embodiments, it will be apparent to those skilled in the art that various changes and modifications may be made without departing from the spirit and scope of the invention as defined in the following claims.

What is claimed is:

1. An apparatus for receiving data in a communication system, comprising:
   a receiving unit configured to receive data transmitted from an access point (AP) by a multi-input multi-output (MIMO) scheme;
   a detecting unit configured to detect a data stream of the received data using an LQ decomposition scheme that decomposes the received data, wherein the LQ decomposition scheme decomposes the received data into an L matrix in a low-triangular matrix form and a Q matrix in a unitary matrix form;
   a generating unit configured to generate channel information regarding the data stream, the channel information including the Q matrix; and
   a transmitting unit configured to feedback the channel information including the Q matrix to the AP.

2. The apparatus for receiving data of claim 1, wherein the receiving unit receives data transmitted from the AP through a wireless channel by a single user-MIMO scheme or a multi user-MIMO scheme.

3. The apparatus for receiving data of claim 1, wherein the data transmitted from the AP includes data transmitted using beamforming based on the Q matrix.

4. The apparatus for receiving data of claim 3, wherein an effective channel of the wireless channel is a unitary matrix× low-triangular matrix form by the single user-MIMO according to the beamforming.

5. The apparatus for receiving data of claim 3, wherein the effective channel of the wireless channel is a block diagonal matrix form by the multi user-MIMO scheme according to the beamforming.

6. A method for receiving data, comprising:
- receiving data transmitted from an access point (AP) by a multi-input multi-output (MIMO) scheme;
- detecting a data stream of the received data using an LQ decomposition scheme to decompose the received data, wherein the LQ decomposition scheme decomposes the received data into an L matrix in a low-triangular matrix form and a Q matrix in a unitary matrix form;
- generating channel information regarding the data stream, the channel information including the Q matrix; and
- feedbacking the channel information including the Q matrix to the AP.

7. The method of claim 6, wherein at the receiving of the data, the receiving unit receives data transmitted from the AP through a wireless channel by a single user-MIMO scheme or a multi user-MIMO scheme.

8. The method of claim 6, further comprising receiving data transmitted from the AP including data transmitted using beamforming based on the Q matrix.

9. The method of claim 8, wherein an effective channel of the wireless channel is a unitary matrix×low-triangular matrix form by the single user-MIMO according to the beamforming.

10. The method of claim 8, wherein the effective channel of the wireless channel is a block diagonal matrix form by the multi user-MIMO scheme according to the beamforming.

11. The method of claim 6, further comprising performing receive antenna selection.

12. The method of claim 6, further comprising performing receive antenna selection per-tone.

13. The apparatus for receiving data of claim 1, further comprising the receiving unit configured to select a receive antenna.

14. The apparatus for receiving data of claim 1, further comprising the receiving unit configured to select a receive antenna per-tone.

* * * * *